United States Patent
Cho et al.

(10) Patent No.: US 11,837,130 B2
(45) Date of Patent: Dec. 5, 2023

(54) MOBILE TERMINAL

(71) Applicant: LG ELECTRONICS INC., Seoul (KR)

(72) Inventors: Ilkyoung Cho, Seoul (KR); Hyunhak Cho, Seoul (KR); Hangyu Oh, Seoul (KR); Yunsuk Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/756,301

(22) PCT Filed: Nov. 22, 2019

(86) PCT No.: PCT/KR2019/016127
§ 371 (c)(1),
(2) Date: May 20, 2022

(87) PCT Pub. No.: WO2021/100934
PCT Pub. Date: May 27, 2021

(65) Prior Publication Data
US 2022/0415227 A1 Dec. 29, 2022

(51) Int. Cl.
*G09G 3/00* (2006.01)
*H04M 1/724* (2021.01)
(Continued)

(52) U.S. Cl.
CPC .......... *G09G 3/035* (2020.08); *G09G 3/3233* (2013.01); *G09G 3/3266* (2013.01);
(Continued)

(58) Field of Classification Search
CPC .... G09G 3/035; G09G 3/3233; G09G 3/3266; H04M 1/724
(Continued)

(56) References Cited

U.S. PATENT DOCUMENTS

2012/0194773 A1* 8/2012 Kim .................. G09G 3/3674
349/139
2014/0217474 A1* 8/2014 Lee .................. H01L 27/14609
257/225
(Continued)

FOREIGN PATENT DOCUMENTS

KR 10-2015-0027460 3/2015
KR 10-2015-0115618 10/2015
(Continued)

OTHER PUBLICATIONS

ParkJung Sik et al. Electronic Device Including Flexible Display and Method for Controlling Thereof Aug. 30, 2019 Samsung Electronics Co Ltd KR20190101184 paragraph 2, 174, 283, 341, 344, 347, 490, figures 15, 34, 38a, 38c, 39, English abstarct and specification.*

(Continued)

*Primary Examiner* — Prabodh M Dharia
(74) *Attorney, Agent, or Firm* — LEE, HONG, DEGERMAN, KANG & WAIMEY PC

(57) ABSTRACT

According to one embodiment, provided is a mobile terminal for driving a large screen in sections, wherein the mobile terminal may comprise: a display panel including an active area from which an image is output; a first active area on one side of the active area divided into two sides; a second active area on the other side of the active area divided into two sides; a first driver provided in the display panel to control an image output from the first active area provided on the one side; and a second driver provided in the display panel to control an image output from the second active area provided on the other side.

13 Claims, 20 Drawing Sheets

(51) Int. Cl.
*G09G 3/3233* (2016.01)
*G09G 3/3266* (2016.01)

(52) U.S. Cl.
CPC .... *H04M 1/724* (2021.01); *G09G 2300/0804* (2013.01); *G09G 2300/0842* (2013.01); *G09G 2310/0221* (2013.01); *G09G 2330/021* (2013.01); *G09G 2354/00* (2013.01)

(58) Field of Classification Search
USPC .......................... 345/204, 520, 215; 349/139
See application file for complete search history.

(56) References Cited

U.S. PATENT DOCUMENTS

| | | |
|---|---|---|
| 2015/0022515 A1 | 1/2015 | Ikeda et al. |
| 2015/0243202 A1 | 8/2015 | Lombardi et al. |
| 2016/0189655 A1* | 6/2016 | Choi .................... G09G 3/3674 345/215 |
| 2017/0135213 A1* | 5/2017 | Lee ...................... G09G 3/2092 |
| 2018/0182278 A1* | 6/2018 | Kim .................... G09G 3/2018 |
| 2020/0402462 A1* | 12/2020 | Takahara ........... H10K 50/8428 |
| 2021/0399063 A1* | 12/2021 | Yamaue ............... G09G 3/3233 |

FOREIGN PATENT DOCUMENTS

| | | |
|---|---|---|
| KR | 10-2017-0049777 | 5/2017 |
| KR | 10-2019-0101184 | 8/2019 |

OTHER PUBLICATIONS

PCT International Application No. PCT/KR2019/016127, International Search Report dated Aug. 21, 2020, 13 pages.
European Patent Office Application Serial No. 19953495.9 Search Report dated Jul. 3, 2023, 10 pages.

* cited by examiner

FIG. 3
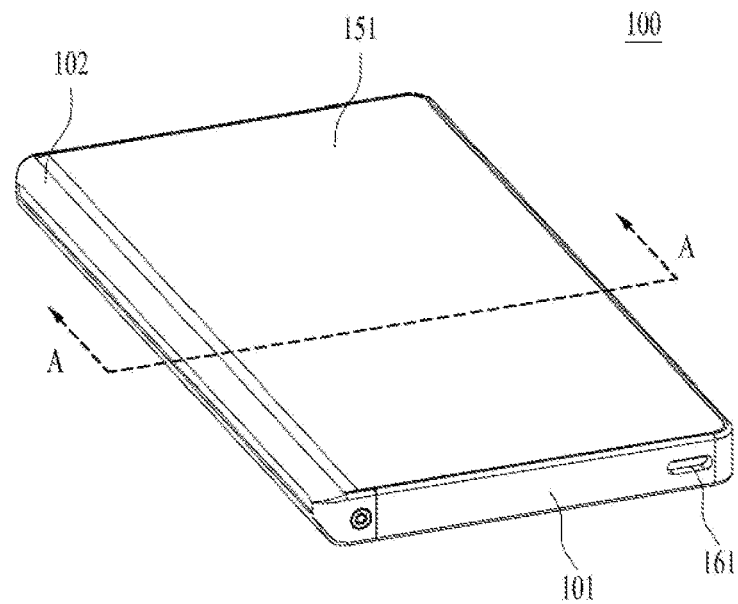
(a)
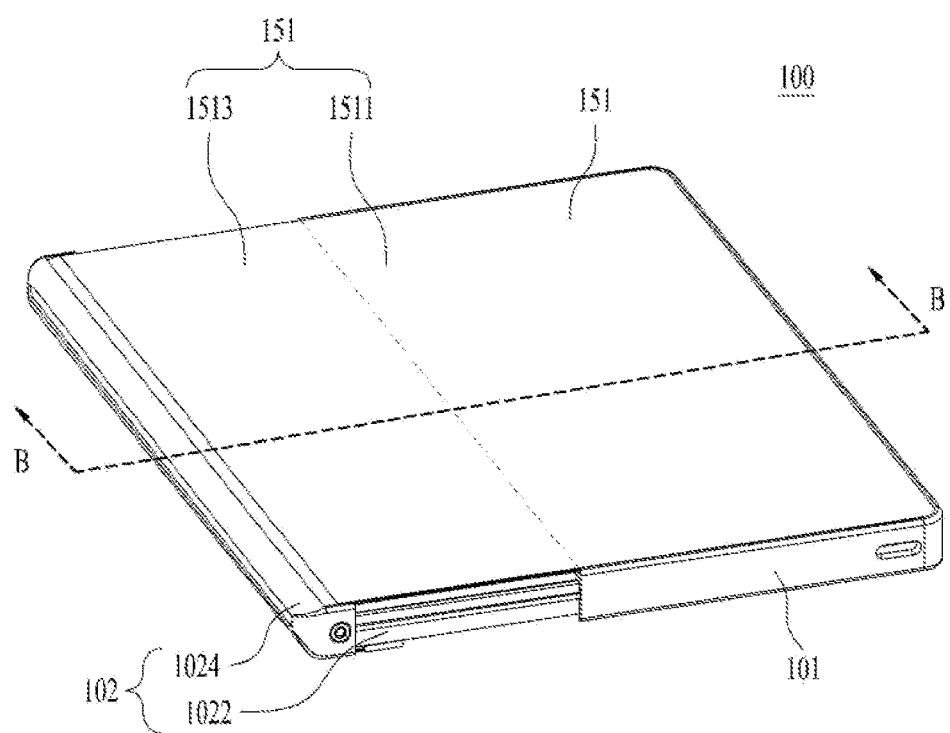
(b)

FIG. 4
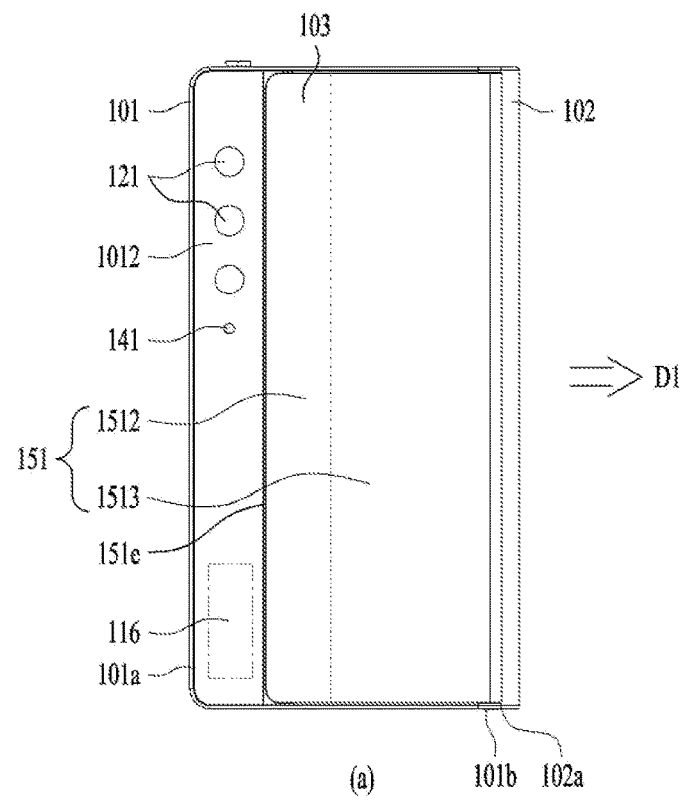
(a)
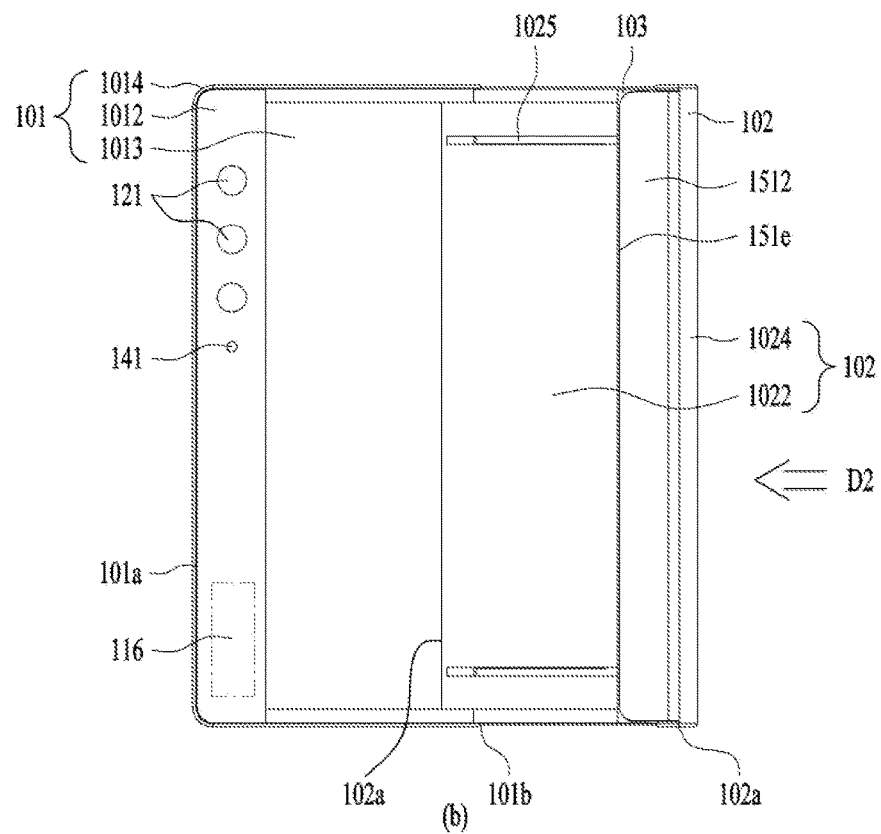
(b)

(a) (b)

MOBILE TERMINAL

CROSS-REFERENCE TO RELATED APPLICATIONS

This application is the National Stage filing under 35 U.S.C. 371 of International Application No. PCT/KR2019/016127, filed on Nov. 22, 2019, the contents of which is hereby incorporated by reference herein in its entirety.

TECHNICAL FIELD

The present disclosure relates to a mobile terminal, and is applicable to a technology field that controls a widened display in a divided manner.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

In one example, recently, the mobile terminal provides a larger screen to the user. The mobile terminal may provide a large screen that is folded in one direction as a foldable mobile terminal or may provide a large screen that is expanded or contracted in one direction as a rollable mobile terminal.

DISCLOSURE

Technical Problem

The present disclosure is to provide a mobile terminal including a large screen that may be controlled in a divided manner.

Technical Solutions

In order to achieve the above object, a mobile terminal according to one embodiment includes a display panel including an active area for outputting an image, wherein the active area is divided a first active area and a second active area, a first driver disposed at one side of the display panel so as to control an image output from the first active area, and a second driver disposed at the other side of the display panel to control an image output from the second active area.

In addition, according to one embodiment, the first driver may be disposed in an edge at said one side of the display panel, the first drive may include first gate driver applying a driving signal to pixels included in the first active area along at least one of both opposing edge portions of the edge at said one side of the display panel, the second driver may be disposed in an edge at the other side of the display panel, and the second driver may include second gate driver applying a driving signal to pixels included in the second active area along at least one of both opposing edge portions of the edge at the other side of the display panel.

In addition, according to one embodiment, the first gate driver may include two gate drivers respectively disposed at the both opposing edge portions of the edge at said one side of the display panel, and the second gate driver may include two gate drivers respectively disposed at the both opposing edge portions of the edge at the other side of the display panel.

In addition, according to one embodiment, the two gate drivers of the first gate driver may respectively apply the driving signal division areas of the first active area, and the two gate drivers of the second gate driver may respectively apply the driving signal to division areas of the second active area.

In addition, according to one embodiment, the display panel may be a flexible display panel.

In addition, according to one embodiment, the mobile terminal may further include a roller member for winding or bending the display panel at said one side or the other side to change an area of the active area exposed on a front face of the mobile terminal.

In addition, according to one embodiment, the first driver and the second driver may be optionally driven the active area corresponding to the area of the active area exposed on the front face of the mobile terminal.

In addition, according to one embodiment, the first driver may be driven when at least a portion of the first active area is exposed on the front face of the mobile terminal, and the second driver may be driven when at least a portion of the second active area is exposed on the front face of the mobile terminal.

In addition, according to one embodiment, the mobile terminal may further include a first frame, and a second frame coupled to the first frame to be movable toward said one side or the other side of the display panel, and the display panel may be constructed to surround the second frame, so that the area of the active area exposed on the front face of the mobile terminal is the minimum in a first state and the area of the active area exposed on the front face of the mobile terminal is the maximum in a second state.

In addition, according to one embodiment, the second driver may be driven to output the image in the second active area when a state of the display panel is switched from the first state to the second state.

In addition, according to one embodiment, the second driver may be driven when a state of the display panel is switched from the first state to the second state to output the image in the second active area.

In addition, according to one embodiment, the second driver may be driven when a state of the display panel starts to switch from the first state to the second state to output the image in the second active area.

In addition, according to one embodiment, the first active area may include an active area exposed on a side face of the mobile terminal in the first state.

In addition, according to one embodiment, the mobile terminal may further include a sensing unit for sensing whether the front face or a rear face of the mobile terminal faces a user, in the display panel, only the first driver may be driven to output the image in the first active area when the front face of the mobile terminal faces the user in the first state, and, in the display panel, only the second driver may be driven to output the image in the second active area when the rear face of the mobile terminal faces the user in the first state.

In addition, according to one embodiment, the sensing unit may include at least one of a motion sensor for sensing rolling of the mobile terminal and an optical sensor for recognizing a face or a gaze of the user.

Advantageous Effects

Based on the above purpose, the mobile terminal according to one embodiment may drive the large screen in a divided manner.

In addition, the mobile terminal according to one embodiment may optionally drive the divided areas of the large screen based on the state change of the mobile terminal.

In addition, the mobile terminal according to one embodiment may prevent the voltage required to drive the large screen from increasing.

In addition, the mobile terminal according to one embodiment may prevent the increase in the bezel required to drive the large screen.

DESCRIPTION OF DRAWINGS

FIG. 3 shows perspective views respectively illustrating a first state and a second state viewed from one side of a mobile terminal according to one embodiment;

FIG. 4 shows rear face views respectively illustrating a first state and a second state of a mobile terminal according to one embodiment;

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
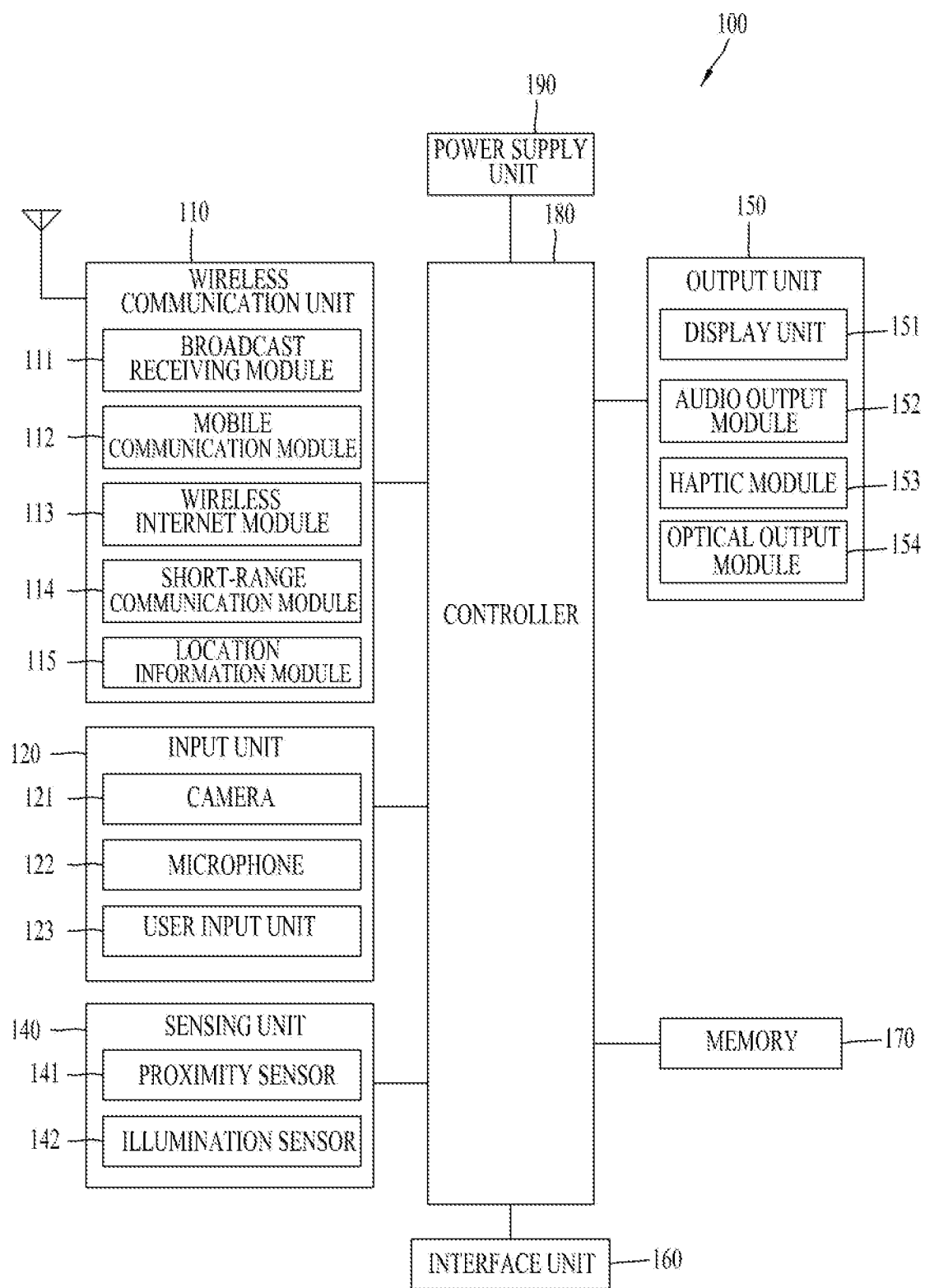
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
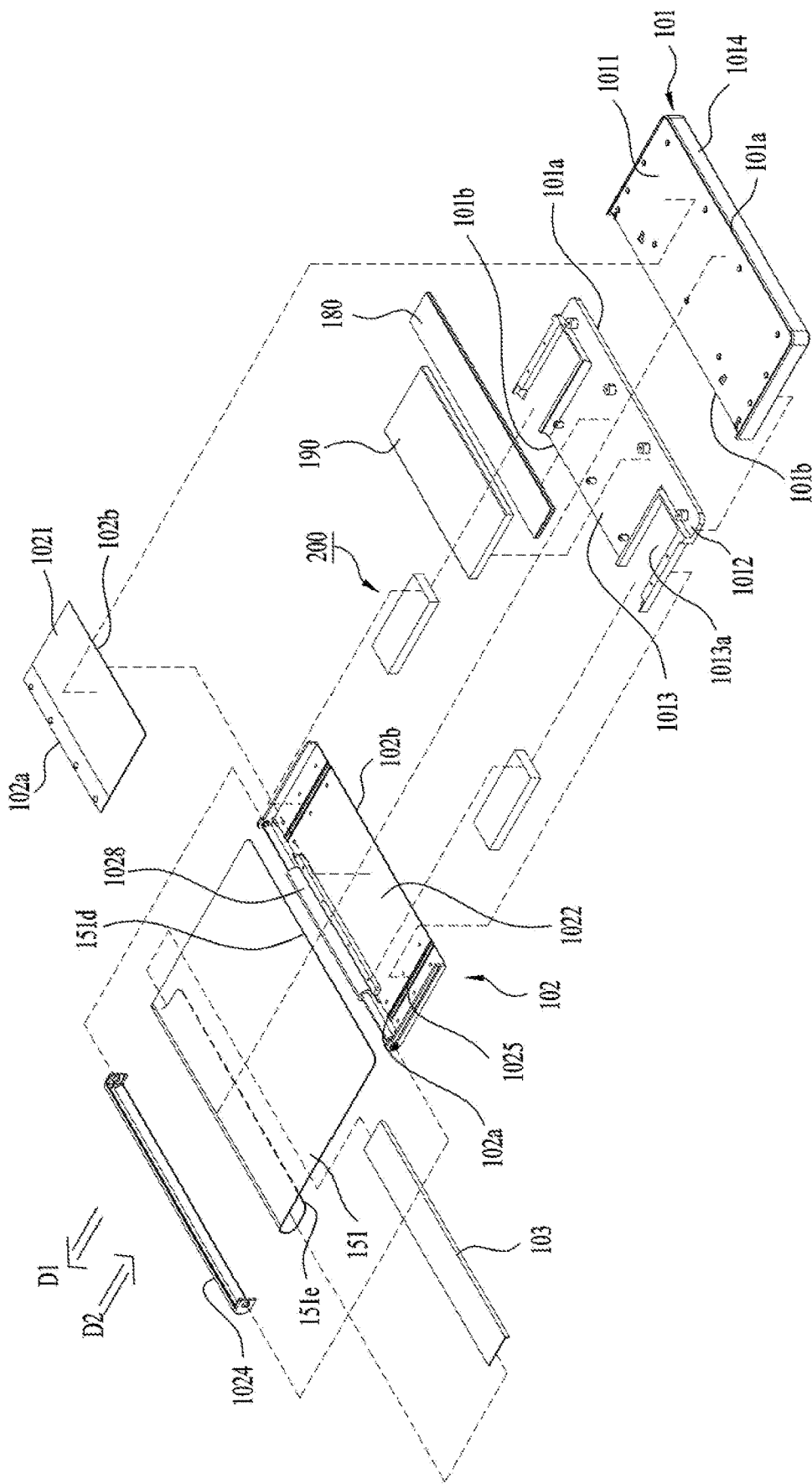
FIG. 2 is an exploded perspective view of a mobile terminal according to one embodiment.
Figure 5:
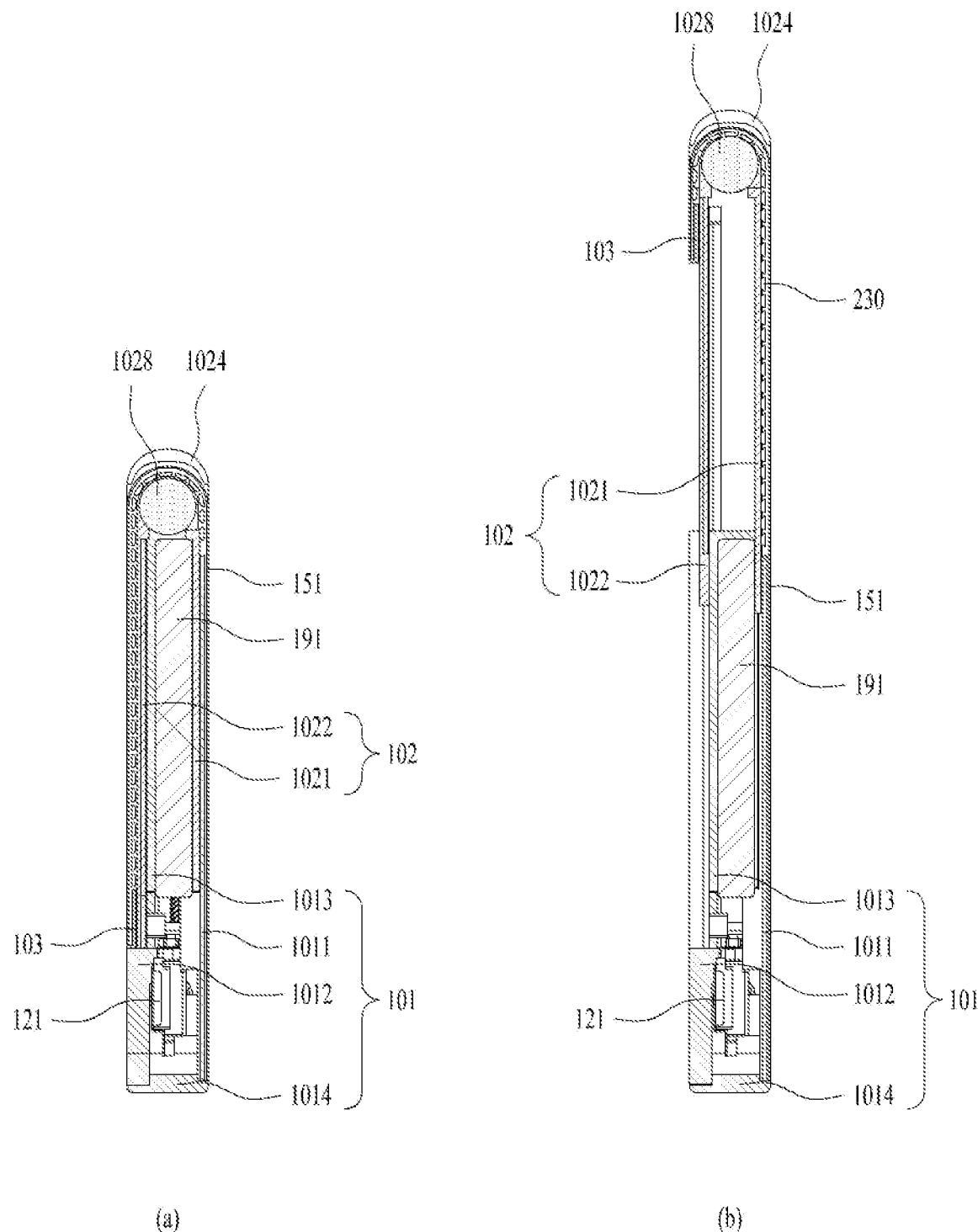
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3 (*a*), 4 (*a*), and 5 (*a*) show a first state of the mobile terminal, and FIGS. 3 (*b*), 4 (*b*), and 5 (*b*) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3 (*a*) into the second state as shown in FIG. 3 (*b*) by enlarging a screen thereof. In the second state, an area of the front face of the display unit 151 is enlarged, and an area of a rear face of the display unit 151 is reduced as shown in FIG. 4 (*b*). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of a illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first area of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and must not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third area. The first to third areas are at specified positions on the flexible display unit and do not change in size or position, but the sizes of the front face and the rear face, and the position of the side face are determined based on the state of the main frame. The first area and the second area correspond to the fixed portion described above, and the third area corresponds to the variable portion described above.

The third area may vary in position depending on the state of the mobile terminal.

Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and an area for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first area 1511 extending from one side thereof, that is, the first side edge 151d toward the second side edge 151e by a predetermined length, and a second area 1512 disposed opposite the first area 1511, and extending from the second side edge 151e toward the first side edge 151d by a predetermined length. In addition, the display unit 151 may include a third area 1513 disposed between the first and second areas 1511 and 1512. Such first to third areas 1511, 1512, and 1513 may be connected to each other, and may form a continuous body of the display unit 151. In addition, as described above, for the movement of the third area 1513 toward the front face or the rear face of the mobile terminal 100 depending on the moving direction of the second frame 102, the first area 1511 may be fixed so as not to move to the front face of the mobile terminal 100, and the second area 1512 may be provided to be movable on the rear face of the mobile terminal. Such configuration of the display unit 151 will be described in more detail below.

The first area 1511 may be disposed on the front face of the mobile terminal 100, more specifically, the first frame 101, that is, on the front face of the first front portion 1011. The first area 1511 is fixed to the first frame 101, that is, the front face of the first front portion 1011 so as not to be moved during the movement of the second frame 102, and thus, the first area 1511 may always be exposed to the front face of the mobile terminal 100. The third area 1513 may be adjacent to the first area 1511, and may extend into the second frame 102 and rolled on the roller 1028. The third area 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third area 1513 is also disposed on the rear face of the first frame 101.

The second area 1512 may be adjacent to the third area 1513 and may be disposed on the rear face of the mobile terminal 100, more specifically, on the second frame, that is, the rear face of the third rear portion 1022 thereof. The second area 1512 may be coupled to the third frame 103 without being directly coupled to the second frame 102. As shown in FIG. 4 (b), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4 (b), it is shown that the slot 1025 is defined in the rear face of the second frame 102, but may be defined in the side face of the second frame 102. Although the second area 1512 may move in the first or second direction D1 or D2 with respect to the second frame 102 together with the third frame 103, the movement of the second area 1512 may be restricted within the rear face of the mobile terminal 100 by the slot 1025. That is, the second area 1512 does not move out of the second frame 102 even when the second frame 102 is extended or contracted, and may move along the slot 1025 within the second frame 102 by the extended or contracted distance of the second frame 102. Accordingly, the second area 1512 may always be exposed to the rear face of the mobile terminal 100.

As a result, the first area 1511 may be disposed on the front face of the mobile terminal 100 and may be always exposed to the front face regardless of the movement of the second frame 102, and the second area 1512 may be disposed on the rear face of the mobile terminal 100 and may be always exposed to the rear face regardless of the movement of the second frame 102. In addition, the third area 1513 may be disposed between the first and second areas 1511 and 1512, and may be selectively placed on the front face or the rear face of the mobile terminal 100 depending on the moving directions D1 and D2 of the second frame 102.

Because of such selective placement of the third area 1513, as shown in FIG. 4 (b), the second rear portion 1013 of the first frame 101 is covered by the second and third areas 1512 and 1513 and the third rear portion 1022 of the display unit 151 in the first state, but the third area 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third area 1513 of the display unit 151 disposed on the front face of the mobile terminal 100 in the second state.

Since the first and second areas 1511 and 1512 are always respectively arranged on the front face and the rear face of the mobile terminal 100, curvatures of the first area 1511 and the second area 1512 do not change, and the first area 1511 and the second area 1512 may be maintained in a flat basic state. However, the third area 1513 may be rolled on the roller 1028 and bent in the second frame 102. When converting from the first state to the second state, the third area 1513 may extend from the second frame 102 to the front face of the mobile terminal 100 while being rolled on the roller 1028 in one direction. On the other hand, when converting from the second state to the first state, the third area 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first area 1511 of the display unit 151 fixed to the front face of the first frame 101 may be exposed to the front face of the mobile terminal 100. Such first area 1511 may be fixed and supported to the first frame 101, that is, the first front portion 1011 thereof. In addition, a major portion of the third area 1513 may be disposed on the rear face of the mobile terminal 100 together with the second area 1512, and the third area 1513 may be disposed in the second frame 102 while being partially rolled on the roller 1028. The third area 1513 of the rear face of the mobile terminal 100 may be supported by the second frame, that is, the third rear portion 1022 thereof. The second area 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third area 1513 to be rolled out from the roller 1028 of the second frame 102 to the front face of the mobile terminal 100. That is, the third area 1513 may be withdrawn (or pulled out) from the second frame 102 or extend to (or move out of) the second frame 102. At the same time, the third area 1513, particularly, the portion located on the rear face of the third area 1513 may be rolled into the roller 1028 of the second frame 102 from the rear face, or may be inserted (or pushed in), retracted, or moved into the second frame 102. Not an entirety of the third area 1513 is withdrawn from the second frame 102 to the front face of the mobile terminal 100, and a portion of the third area 1513 may be disposed in the second frame 102 while still being rolled on the roller 1028. In addition, for the smooth movement of the third area 1513, the second area 1512 may also move in the first direction D1 with respect to the second frame 102 together with the third frame 103. In addition, as described above, the second area 1512 and the third frame 103 may be constrained to the second frame 102 and move in the first direction D1 with respect to the first frame 101 together with the second frame 102. Accordingly, the second area 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second area 1512, the third area 1513 may be smoothly extended to the front face of the mobile terminal 100. Further, for the movement of the third area 1513, which is proportional to the expansion of the second frame 102, the movement of the second area 1512 and the third frame 103 in the first direction D1 may be performed simultaneously with the movement of such third area 1512 and second frame 102 in the first direction D1 so as to be proportional to the movement of third area 1513 and second frame 102.

When the second frame 102 is fully extended in the first direction D1, the first and third areas 1511 and 1513 may be arranged on the front face of the mobile terminal 100, and only the second area 1512 may be disposed on the rear face of the mobile terminal 100. Such first and third areas 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third area 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third area 1513 may be rolled from the front face of the mobile terminal 100 into the roller 1028 of the second frame 102, or may be inserted, retracted, or moved into the second frame 102. At the same time, the third area 1513 may be rolled, withdrawn, extended, or moved out of the roller 1028 of the second frame 102 to the rear face of the mobile terminal 100. Not the entirety of the third area 1513 may be withdrawn from the second frame 102 to the rear face of the mobile terminal 100, and the portion of the third area 1513 may still be placed in the second frame 102 while still being rolled on the roller 1028. In addition, for such smooth movement of the third area 1513, the second area 1512 may also move in the second direction D2 with respect to the second frame 102 together with the third frame 103. The second area 1512 and the third frame 103 may be constrained to the second frame 102 to move in the second direction D2 with respect to the first frame 101 together with the second frame 102. Accordingly, the second area 1512 and the third frame 103 may move relatively in the second direction D2 with respect to not only the second frame 102 but also the first frame 101. As a result, the second area 1512 and the third frame 103 may move in the second direction D2 a distance larger than the moved distance of the second frame 102. Thus, because of such long distance movement of the second area 1512, the third area 1513 may be smoothly returned to the rear face of the mobile terminal 100. Further, for the movement of the third area 1513 proportional to the contraction of the second frame 102, the movements of the second area 1512 and the third frame 103 in the second direction D2 may be performed simultaneously with the movements of the third area 1512 and the second frame 102 in the second direction D2 to be proportional to the movements of the third area 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
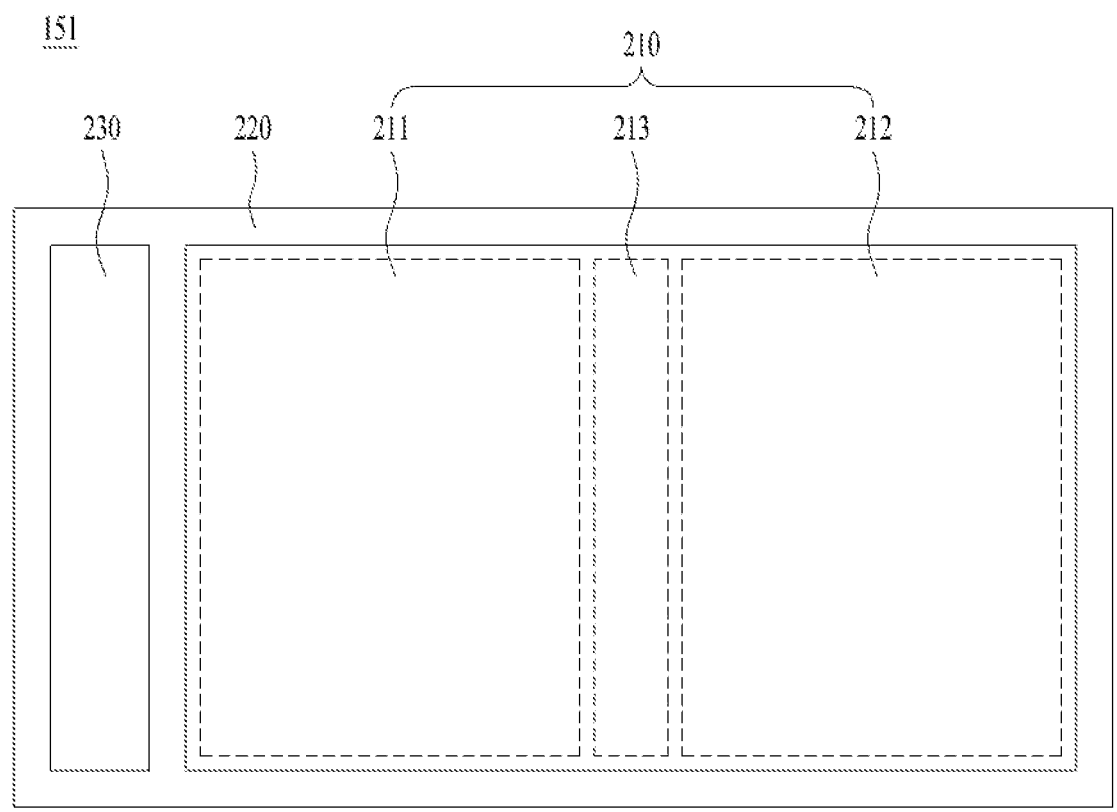
FIG. 6 shows a flexible display panel 151 according to one embodiment.
Figure 7:
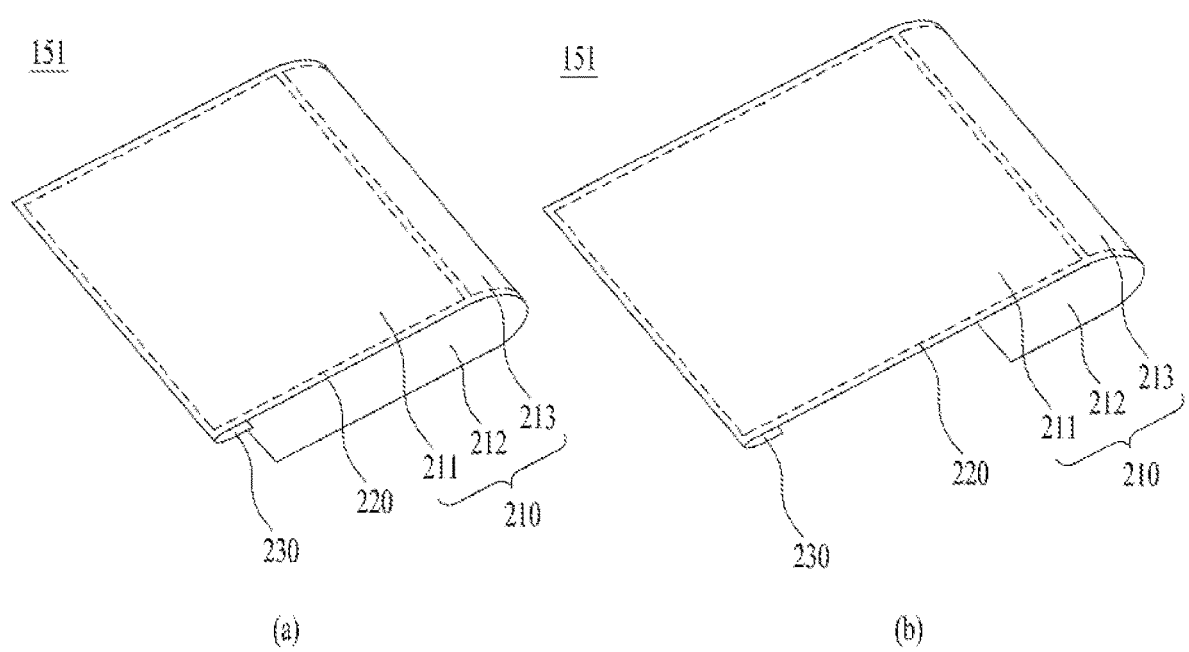
FIG. 7 shows a first state ((a) in FIG. 7) and a second state ((b) in FIG. 7) of a flexible display panel 151 in FIG. 6.

FIG. 6 shows the flexible display panel 151 according to one embodiment. FIG. 7 shows a first state ((a) in FIG. 7) and a second state ((b) in FIG. 7) of the flexible display panel 151 in FIG. 6.

The flexible display 151 according to an embodiment may include an active area 210 on which an image is output and a non-active area 220 disposed around the active area 210. The non-active area 220 may form a bezel at an edge of the active area 210. In addition, the non-active area 220 may include a driver 230 for applying a signal for outputting the image to the active area 210 and a circuit configuration.

In the flexible display 151 according to an embodiment, the active area 210 may be divided into a first active area 211, a second active area 212, and a third active area 213. The first active area 211 may be an area exposed in a direction of the front face of the mobile terminal in the active area 210. The second active area 212 may be an area exposed in a direction of the rear face of the mobile terminal in the active area 210. The third active area 213 as an area defined between the first active area 211 and the second active area 212 may correspond to a portion surrounding the first roller 1028 in FIG. 5.

In the flexible display 151 according to an embodiment, sizes of the first active area 211 and the second active area 212 may vary depending on a state of the mobile terminal. For example, while the state of the mobile terminal changes from the first state ((a) in FIG. 7) to the second state ((b) in FIG. 7), the first active area 211 may become smaller and the second active area 212 may become larger. Conversely, while the state of the mobile terminal changes from the second state ((b) in FIG. 7) to the first state ((a) in FIG. 7), the first active area 211 may become larger and the second active area 212 may become smaller. In this regard, the third active area 213 may only move based on the change in the state, and may be fixed in size.

The flexible display 151 according to one embodiment may be disposed in the mobile terminal such that an area with the driver 230 is disposed on a rear face of the first active area 211, as shown in (a) in FIG. 7. The driver 230 may be mounted in the non-active area 220 in a chip on film scheme. The driver 230 may be a component included in the controller 180 shown in FIG. 1 or a component connected to the controller 180.

The flexible display 151 according to an embodiment may include a circuit configuration for applying a signal from the driver 230 to the active area 210 in the non-active area 220.

Figure 8:
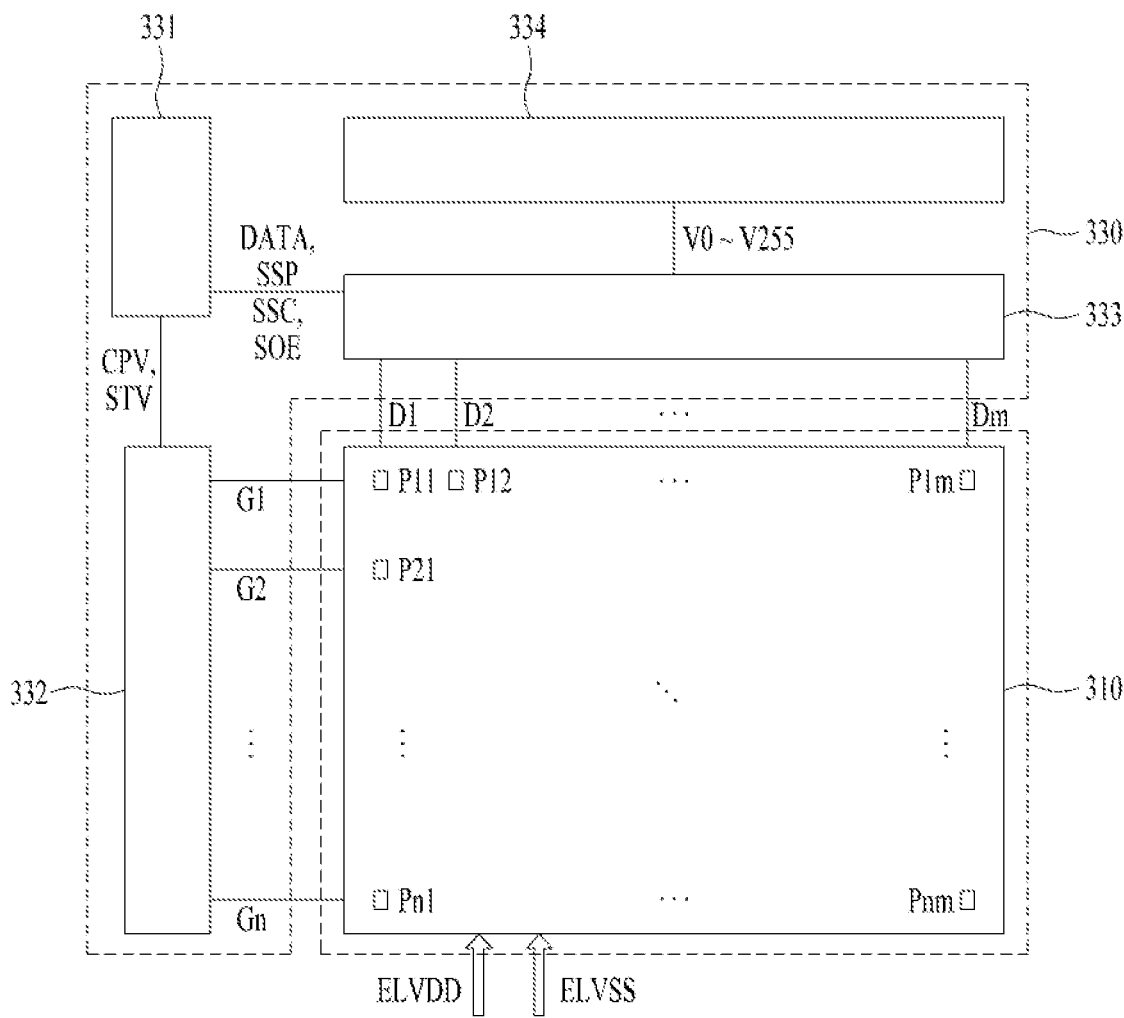
FIG. 8 shows a circuit configuration of a flexible display 151 according to one embodiment.

FIG. 8 shows the circuit configuration of the flexible display 151 according to one embodiment.

The flexible display 151 according to an embodiment may include a pixel array 310 corresponding to the active area 210 in FIG. 6 and a display controller 330 corresponding to the driver 230.

The pixel array 310 according to one embodiment may include pixels P11 to Pnm positioned at intersections of gate lines G1 to Gn and data lines D1 to Dm. Each of the pixels P11 to Pnm may be arranged in an m*n matrix form as shown in FIG. 8. Each of the pixels P11 to Pnm may include a light emitting element, and may receive a power supply voltage ELVDD and a base voltage ELVSS for emitting light from the light emitting element (an organic light emitting diode). Each of the pixels P11 to Pnm may supply a driving current or a voltage to the light emitting element to emit light with a luminance corresponding to a data voltage.

Each of the pixels P11 to Pnm according to an embodiment may control an amount of current supplied to the light emitting element in response to the data voltage transmitted via the data lines D1 to Dm, and the light emitting element may emit light having the luminance corresponding to the data voltage.

The display controller 330 according to an embodiment may include a timing controller 331 for generating control signals and outputting the control signals to a gate driver 332 and a data driver 333, the gate driver 332 for applying a driving signal to each of the plurality of pixels P11 to Pnm via the gate lines G1 to Gn, the data driver 333 for applying a data voltage corresponding to an input image to each of the plurality of pixels P11 to Pnm via the data lines D1 to Dm, and a gray scale voltage generator 150 for generating a plurality of gray scale voltages V0 to V255 and supplying the plurality of gray scale voltages V0 to V255 to the data driver 333.

The timing controller 331 according to an embodiment receives an input image signal and an input control signal for controlling display of the signal from an external graphic controller (not shown). The timing controller 331 generates a gate driving click CPV, a start pulse (STV), and the like, and outputs them to the gate driver 332. In addition, the timing controller 331 generates input image data DATA, a source start pulse SSP, a source shift click SSC, a source output enable SOE, and the like from the input image signal and the image control signal and outputs them to the data driver 333.

The gate driver 332 according to an embodiment generates a driving signal using the gate driving click CPV, the start pulse STV, and the like input from the timing controller 331, and outputs the driving signal to each of the pixels P11 to Pnm via the gate lines G1 to Gn.

The gate driver 332 according to an embodiment may perform an operation of outputting a light emission control signal to a plurality of light emission control lines (not shown) connected to the plurality of pixels P11 to Pnm as well as to the gate lines G1 to Gn. That is, the gate driver 332 may sequentially or simultaneously output the driving signals and the light emission control signals in units of rows via the gate lines G1 to Gn and the light emission control lines (not shown).

Figure 9:
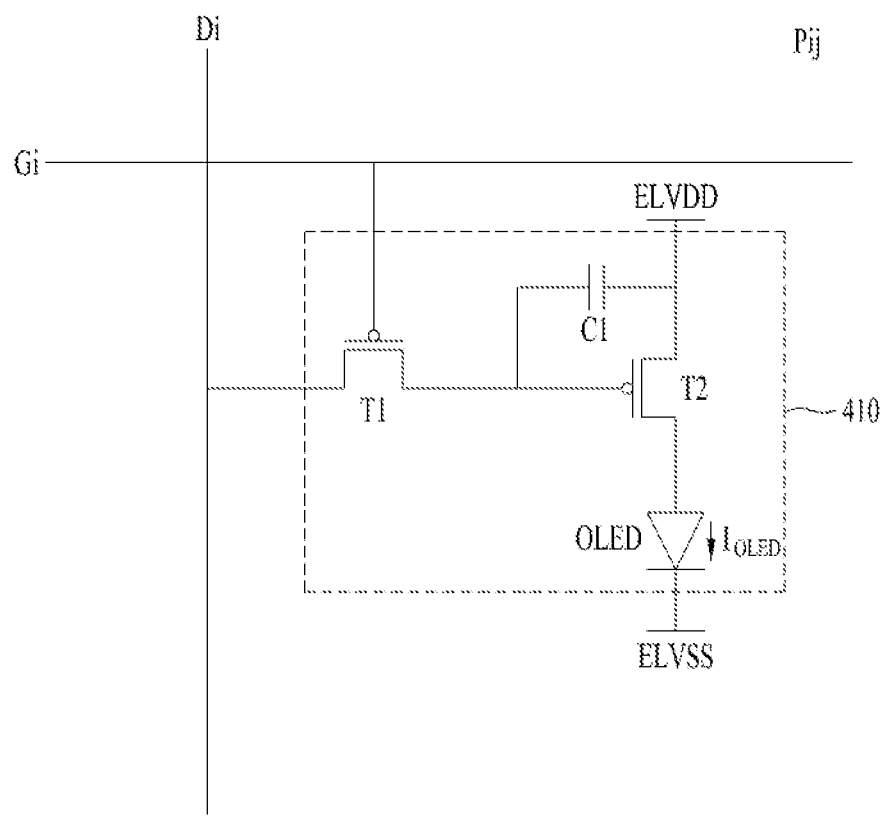
FIG. 9 shows one embodiment of a circuit configuration of a pixel Pij shown in FIG. 8.

FIG. 9 shows one embodiment of a circuit configuration of a pixel Pij shown in FIG. 8.

The pixel Pij according to one embodiment as a light emitting element may include an organic light emitting diode (OLED) and a pixel circuit 410.

The organic light emitting diode (OLED) according to one embodiment may receive a driving current I_OELD output from the pixel circuit 410 and emit light, and a luminance of the light emitted from the organic light emitting diode (OLED) may vary depending on a magnitude of the driving current I_OLED.

The pixel circuit 410 according to one embodiment may include a capacitor C1, a first transistor T1, and a second transistor T2. The first transistor T1 may include a first terminal connected to a data line Di, a second terminal connected to a gate terminal of the second transistor T2, and a gate terminal connected to a gate line Gi. The second transistor T2 may include a first terminal supplied with the power supply voltage ELVDD, a second terminal connected to an anode of the organic light emitting diode (OLED), and a gate terminal connected to a second terminal of the first transistor T1. A cathode of the organic light emitting diode (OLED) may be connected to the base voltage (ELVSS). In this regard, the capacitor C1 of the pixel circuit 410 may be connected to the first terminal and the gate of the second transistor T2.

The organic light emitting diode (OLED) according to an embodiment may emit light in response to the driving current I_OLED generated by the second transistor T2. Specifically, when the driving signal is applied to the first transistor via the gate line Gi, the data signal may be transmitted to the gate terminal of the second transistor T2 and the capacitor C1 via the first transistor T1. While a valid data signal is applied via the data line Dj, a voltage of a level corresponding to the data signal may be charged in the capacitor C1 to uniformly control the driving current I_OLED applied to the organic light emitting diode (OLED).

Figure 10:
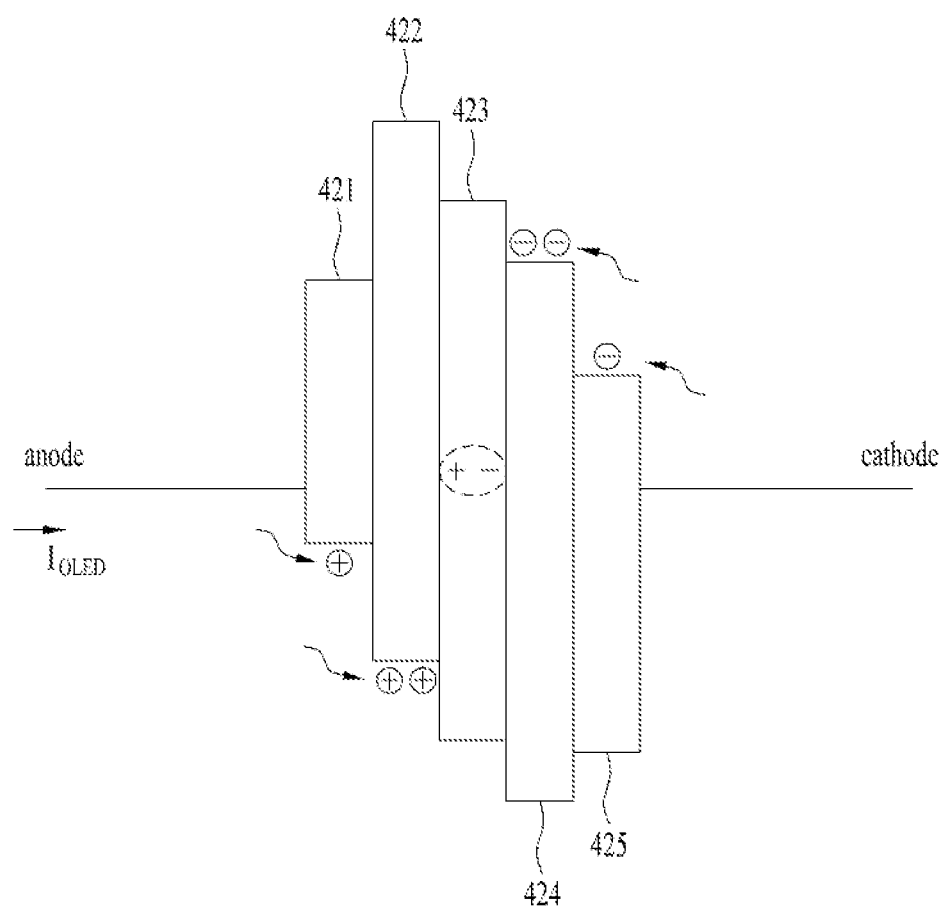
FIG. 10 shows one embodiment of an organic light emitting diode (OELD) included in FIG. 9.

FIG. 10 shows one embodiment of an organic light emitting diode (OELD) included in FIG. 9.

The organic light emitting diode (OLED) according to one embodiment may include organic compound layers 421 to 425 formed between an anode, which is a pixel electrode, and a cathode, which is a common electrode. The organic compound layers 421 to 425 may include a hole injection layer 421, a hole transport layer 422, a light emitting layer 423, an electron transport layer 424, and an electron injection layer 425.

In the organic light emitting diode (OLED) according to one embodiment, when a driving voltage is applied to the anode and the cathode, holes that have passed through the hole transport layer 422 and electrons that have passed through the electron transport layer 424 may move to the light emitting layer 423 to form excitons. As a result, the light emitting layer 423 may emit visible light.

Figure 11:
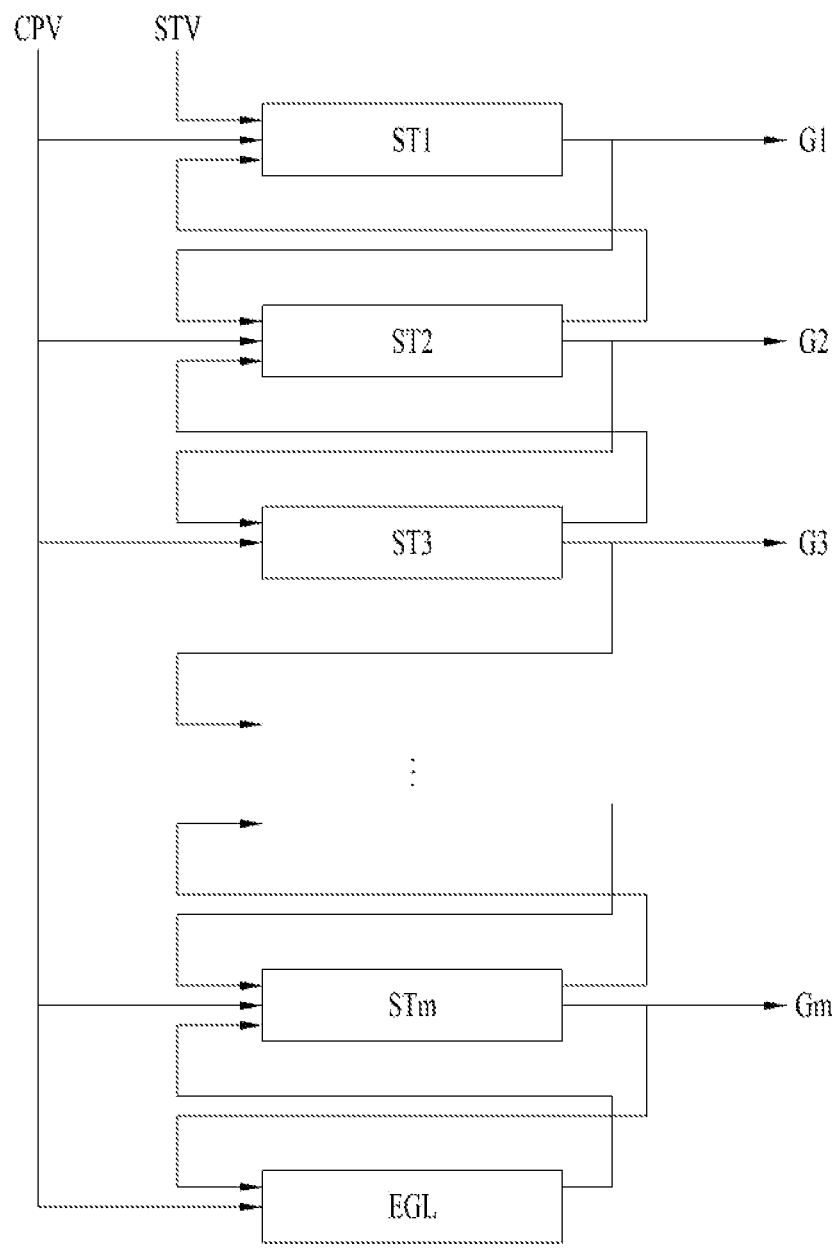
FIG. 11 shows one embodiment of a circuit configuration of a gate driver 332 included in FIG. 8.

FIG. 11 shows one embodiment of a circuit configuration of a gate driver 332 included in FIG. 8.

The gate driver 332 according to one embodiment may include a gate in panel (GIP) circuit shown in FIG. 11. The GIP driving circuit may constitute a shift register, and the shift register may include a plurality of subordinately connected stages SL1 to SLn.

The gate driver 332 according to one embodiment is composed of the stages ST1 to STn that sequentially output the driving signals by shifting the start pulse STV based on the gate driving click CPV.

Figure 14:
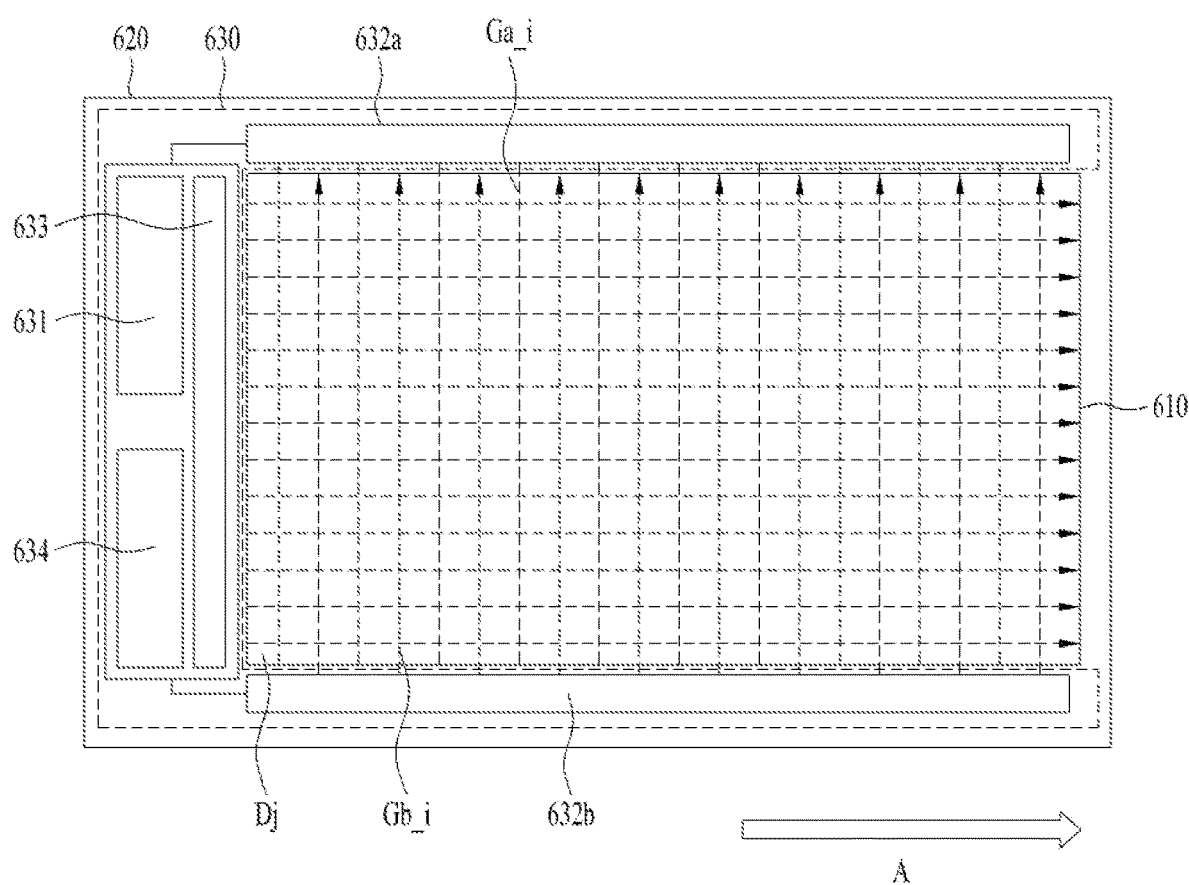
FIG. 14 shows one embodiment of the flexible display panel 151 including one driver 630.

The GIP driving circuit of the gate driver 332 according to one embodiment may be disposed at both edges of the flexible display panel 151 as shown in FIG. 14. When the GIP driving circuit is divided into two GIP driving circuits and the two GIP driving circuits are disposed at the both edges, a width of the bezels on both sides of the active area 210 may be reduced. However, the GIP driving circuit of the gate driver 332 may be disposed at one edge of the flexible display panel 151.

The GIP driving circuit according to one embodiment may include the plurality of stages ST1 to STn to which the gate driving click CPV and the start pulse STV are input. Each of the stages ST1 to STn generates an output in response to the start pulse STV and shifts the output based on the gate driving click CPV.

The gate driver 332 according to one embodiment includes the plurality of subordinately connected stages ST1 to STn (where n is a natural number equal to or greater than 2). Each of the stages ST1 to STn outputs the driving signal via each of the gate lines G1 to Gn. In this regard, the gate signal may correspond to a gate voltage or a gate pulse. The gate signal may be applied to the pixel Pij and transmitted to a front stage and a rear stage at the same time.

The stages ST1 to STn of the gate driver 332 according to one embodiment start outputting the driving signals in response to the start pulse STV and shift the driving signals in response to the gate driving click CPV.

Figure 12:
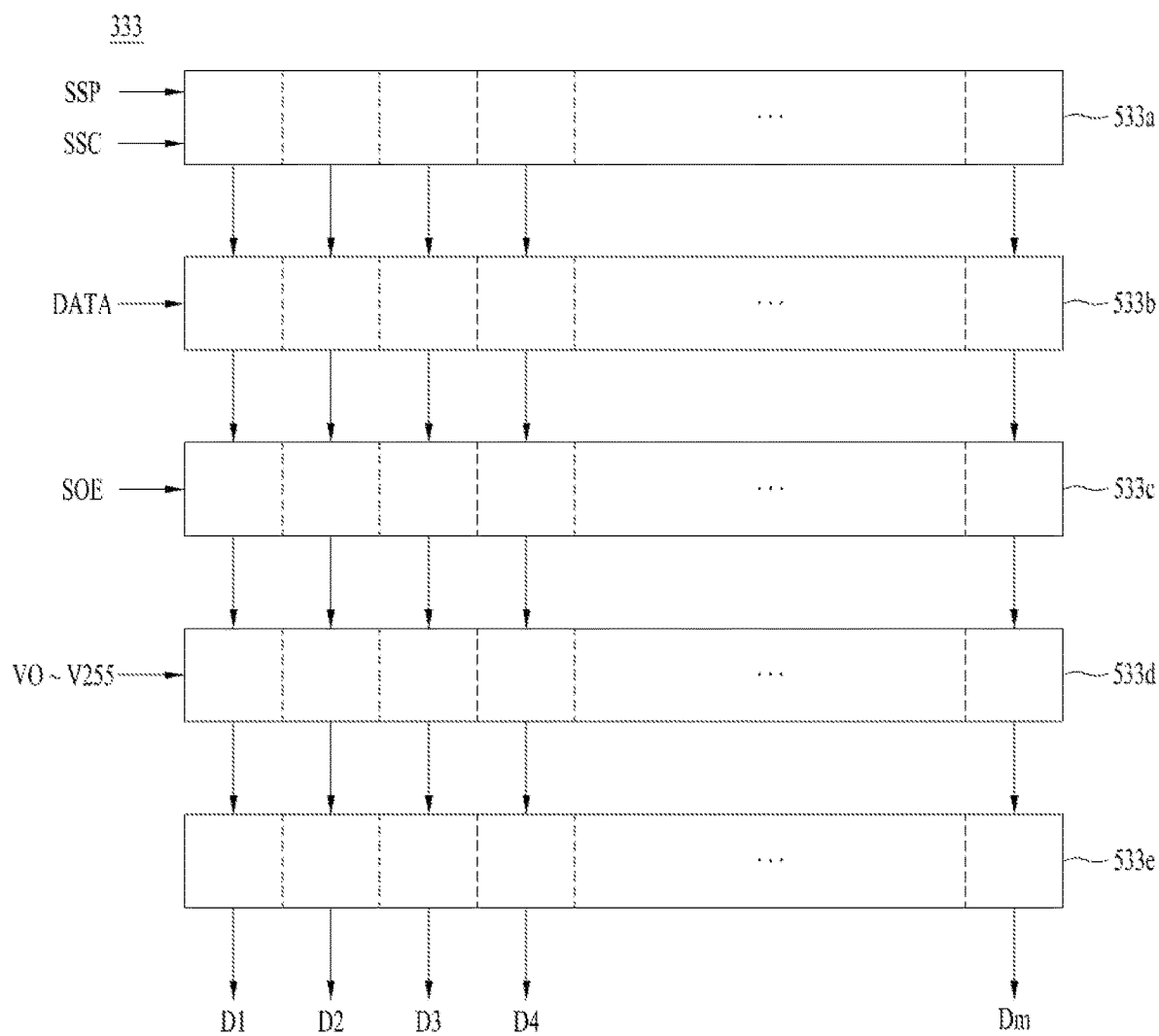
FIG. 12 shows one embodiment of a circuit configuration of a data driver 333 included in FIG. 8.

FIG. 12 shows one embodiment of a circuit configuration of a data driver 333 included in FIG. 8.

The data driver 333 according to one embodiment includes a shift register unit 533a, a sampling latch unit 533b, a holding latch unit 533c, a digital-analog converter unit (DAC unit) 533d, and a buffer unit 533e.

The shift register unit 533a according to one embodiment receives the source start pulse SSP and the source shift click SSC from the timing controller 331. The shift register 533a receiving the source shift click SSC and the source start pulse SSP sequentially generates m sampling signals while shifting the source start pulse SSP for each cycle of the source shift click SSC. To this end, the shift register unit 533a includes m shift registers.

The sampling latch unit 533b according to one embodiment sequentially stores the input image data DATA in response to the sampling signals sequentially supplied from the shift register unit 533a. To this end, the sampling latch unit 533b includes m sampling latches to store the m input image data DATA.

The holding latch unit 533c according to one embodiment receives the source output enable (SOE) signal from the timing controller 331. The holding latch unit 533c receiving the source output enable (SOE) signal receives the input image data DATA from the sampling latch unit 533b and stores the input image data DATA. In addition, the holding latch unit 533c supplies the input image data DATA stored therein to the DAC unit 533d. To this end, the holding latch unit 533c has m holding latches.

The DAC unit 533d according to one embodiment receives the input image data DATA from the holding latch unit 533c and receives gray scale voltages V0 to V255 from a gray scale voltage generator 334 to generate m data voltages in response to the input image data DATA and supply the generated data voltages to the buffer unit 533e.

The buffer unit 533e according to an embodiment supplies the m data voltages supplied from the signal generator 533d to the m data lines D1 to Dm, respectively. To this end, the buffer unit 533e includes m buffers.

Figure 13:
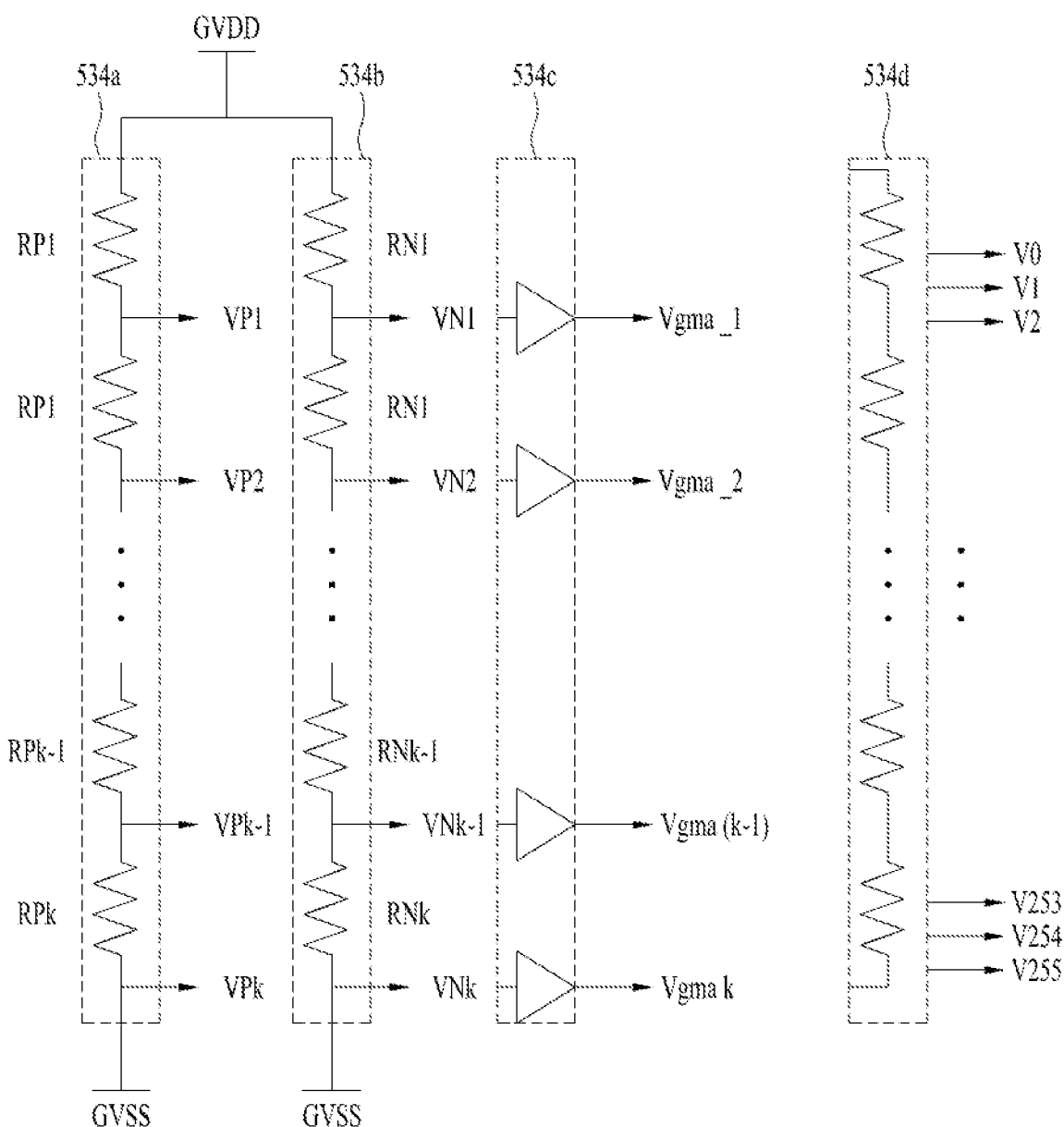
FIG. 13 shows one embodiment of a circuit configuration of a gray scale voltage generator included in FIG. 8.

FIG. 13 shows one embodiment of a circuit configuration of a gray scale voltage generator 334 included in FIG. 8.

The gray scale voltage generator 334 according to one embodiment may generate the plurality of gamma-corrected gray scale voltages V0 to V255 and output the generated gray scale voltages to the data driver 333. The plurality of gray scale voltages V0 to V255 may vary based on the number of gray scales expressed on the flexible display 151. In the embodiment of the present disclosure, a description is made on the basis that the gray scale expressed in the flexible display 151 is a 256-level gray scale, but the embodiment of the present disclosure is not necessarily limited thereto.

The gray scale voltage generator 334 according to an embodiment may include a positive gamma unit 534a and a negative gamma unit 534b connected in parallel between a power supply voltage GVDD and a base voltage GVSS, a buffer unit 534c, and a distribution unit 534d.

Each of the positive gamma unit 534a and the negative gamma unit 534b includes each of a group of a plurality of positive resistances RP1 to RPk and a group of a plurality of negative resistances RN1 to RNk connected in series between the power supply voltage GVDD and the base voltage GVSS. With such configuration, in each of the positive gamma unit 534a and the negative gamma unit 534b, the power supply voltage GVDD is divided by the resistances of each of the group of the plurality of positive resistances RP1 to RPk and the group of the plurality of negative resistances RN1 to RNk to generate k positive voltages VP1 to VPk or k negative gamma voltages VN1 to VNk.

The buffer unit 534c outputs the positive gamma voltages VP1 to VPk and the negative gamma voltages VN1 to VNk generated by the positive gamma unit 534a and the negative gamma unit 534b in a predetermined order. Such buffer unit 534c serves to suppress output fluctuations of output gamma voltages VGna_1 to VGna_k.

The distribution unit 534d may generate the plurality of gray scale voltages V0 to V255 respectively representing voltage levels of the gray scale via voltage division of output gamma voltages Vgma_1 to Vgma_k output from the buffer unit 534d. The distribution unit 534d includes a resistance column in which a plurality of resistances are connected to each other in series. The plurality of output gamma voltages Vgma_1 to Vgma_k may be applied to some of nodes of the resistance column, and the applied output gamma voltages Vgma_1 to Vgma_k may be divided by the resistances to be output as the plurality of gray scale voltages V0 to V255. The plurality of gray scale voltages V0 to V255 may be provided to the data driver 333 (see FIG. 8), and a voltage corresponding to the data signal of each pixel may be selected among the plurality of gray scale voltages V0 to V255.

FIG. 14 shows one embodiment of the flexible display panel 151 including one driver 630.

The flexible display panel 151 according to one embodiment may control an image output in an active area 610 using one driver 630. In this regard, the driver 630 and the active area 610 may correspond to the driver 230 and the active area 610 in FIG. 6, respectively. In addition, the driver 630 and the active area 610 may correspond to the display controller 330 and the pixel array 310 in FIG. 8, respectively. Specifically, the driver 630 may be disposed in the non-active area 620 separated from the active area 610.

The driver 630 according to one embodiment may include a timing controller 631, a data driver 633, and a gray scale voltage generator 634 at one edge of the flexible display panel 151. In this case, the flexible display panel 151 may include gate drivers 632a and 632b at both edges with said one edge interposed therebetween. When the gate drivers 632a and 632b are respectively disposed at the both edges, a thickness of the bezel formed at each of the both edges may be reduced.

The flexible display panel 151 according to an embodiment may include the gate drivers 632a and 632b at the both edges directed parallel to a first direction A. A first gate line Ga_i along which a driving signal output from the first gate driver 632a passes and a second gate line Gb_i along which a driving signal output from the first gate driver 632b passes may intersect each other in the active area 610.

The flexible display panel 151 according to an embodiment may be formed long in the first direction A. In this regard, the first direction A may correspond to a direction in which the flexible display panel 151 is folded as shown in FIG. 7.

When the flexible display panel 151 is formed long in the first direction A, following problems may occur. First, in order to generate a driving voltage generated at an end point in the first direction A to be the same as a driving voltage generated at a starting point in the first direction A, a voltage provided via the timing controller 631 may be increased. In the voltage transferred to the end point in the first direction A, a voltage drop may occur due to an internal resistance and the like of a conducting wire. Accordingly, the voltage provided via the timing controller 631 may be required to be higher as the flexible display panel 151 is formed longer in the first direction A. Second, a large amount of power may be consumed as the driving voltage is uniformly applied to the wider screen area A. Third, in response to the increasing number of gate lines along the first direction A, the thickness of the bezel required for each of the both edges disposed along the first direction A may increase.

Figure 15:
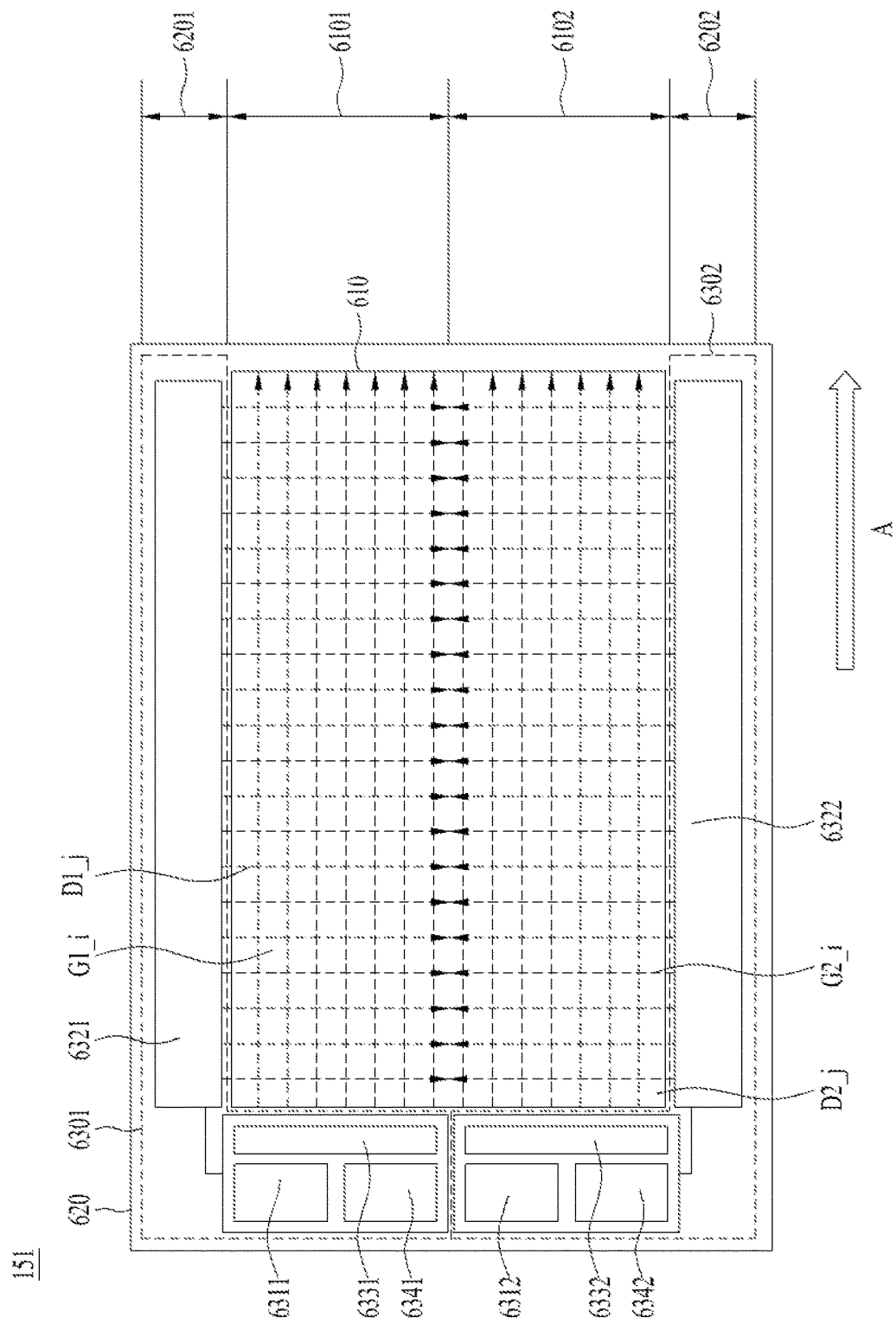
FIG. 15 shows one embodiment of a flexible display panel 151 including two drivers.

FIG. 15 shows one embodiment of a flexible display panel 151 including two drivers 6301 and 6302.

The flexible display panel 151 according to one embodiment may include a first driver 6301 and a second driver 6302.

The active area 610 may be divided into a fifth active area 6101 and a sixth active area 6102. The first driver 6301 may control an image signal output from the fifth active area 6101. The second driver 6302 may control an image signal output from the sixth active area 6102.

When the first direction A in FIG. 15 is viewed as a right direction, the flexible display panel 151 according to one embodiment may distinguish an upper area of the active area 610 as the fifth active area 6101 and distinguish a lower area of the active area 610 as the sixth active area 6102. The first driver 6301 may control the image signal output from the fifth active area 6101. The second driver 6302 may control the image signal output from the sixth active area 6102.

The first driver 6301 may drive pixels (not shown) included in the fifth active area 6101 via third gate lines G1_i, and may provide the image signal to the pixels (not shown) included in the fifth active area 6101 via third data lines D1_j. Similarly, the second driver 6302 may drive pixels (not shown) included in the sixth active area 6102 via fourth gate lines G2_i, and may provide the image signal to the pixels (not shown) included in the sixth active area 6102 via fourth data lines D2_i.

The first driver 6301 may include a first timing controller 6321, a first gate driver 6321, a first data driver 6331, and a first gray scale voltage generator 6341. The first driver 6301 may be disposed in portions on the left side of and above the fifth active area 6101. Specifically, the first timing controller 6321 and the first data driver 6331 may be disposed in the portion on the left side of the fifth active area 6101, and the first gate driver 6321 may be disposed in the portion above the fifth active area 6101. The first gate driver 6321 may be disposed at an upper bezel 6201 of the flexible diffuser panel 151.

The second driver 6302 may include a second timing controller 6312, a second gate driver 6322, a second data driver 6332, and a second gray scale voltage generator 6342. The second driver 6302 may be disposed on portions on the left side of and below the sixth active area 6102. Specifically, the second timing controller 6322 and the second data driver 6332 may be disposed in the portion on the left side of the sixth active area 6102, and the second gate driver 6322 may be disposed in the portion below the sixth active area 6102. The second gate driver 6332 may be disposed at a lower bezel 6202 of the flexible display panel 151.

Because the embodiment shown in FIG. 15 uses the two drivers 6301 and 6302 to drive the screen in a divided manner, a load required for one driver may be reduced. However, because the embodiment shown in FIG. 15 divides the active area 610 in a vertical direction, the mobile terminal whose screen is expanded in the first direction A may have following disadvantages. First, the two drivers 6301 and 6302 are not able to be optionally used. The two drivers 6301 and 6302 may drive the areas divided vertically in the active area 610. On the other hand, considering that the screen expands or contracts in the first direction A in the direction of the front face, both of the drivers 6301 and 6302 must be operated. Second, an increase in the upper and lower bezels 6201 and 6202 may occur. When one driver is used, the problem of increasing the bezel may be solved by dividing the gate driver connected to one driver in the vertical direction. However, when two drivers are disposed, two gate drivers are also required, so that the bezel increases. Third, there is a problem that a large amount of power is consumed. As the flexible display panel 151 is manufactured large in the first direction A, a large voltage drop may occur on the gate drivers 6321 and 6322 disposed in the first direction A. Accordingly, a problem in that a higher voltage is required to drive the flexible display panel 151 may occur.

Figure 16:
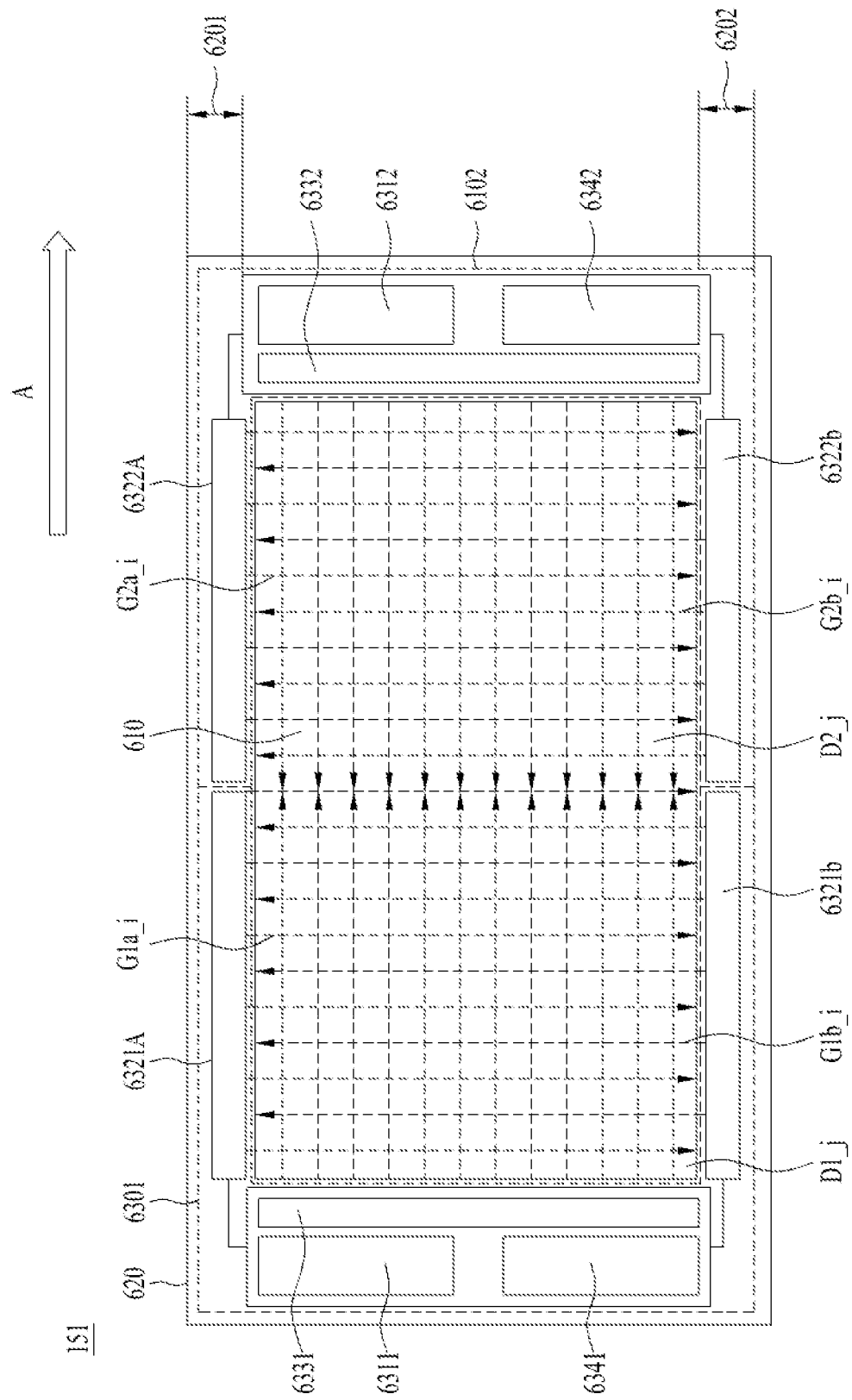
FIG. 16 shows an embodiment of a flexible display panel including two drivers.

FIG. 16 shows an embodiment of the flexible display panel 151 including the two drivers 6301 and 6302.

The flexible display panel 151 according to an embodiment may include the first driver 6301 and the second driver 6302.

The active area 610 may be divided into a seventh active area 6103 and an eighth active area 6104. The first driver 6301 may control an image signal output from the seventh active area 6103. The second driver 6302 may control an image signal output from the eighth active area 6104.

When the first direction A in FIG. 16 is viewed as the right direction, the flexible display panel 151 according to one embodiment may distinguish a left area of the active area 610 as the seventh active area 6103 and distinguish a right area of the active area 610 as the eighth active area 6104. The first driver 6301 may control the image signal output from the seventh active area 6103. The second driver 6302 may control the image signal output from the eighth active area 6104.

The first driver 6301 may drive pixels (not shown) included in the seventh active area 6103 via fifth gate lines G1a_i and G1b_i, and may provide the image signal to the pixels (not shown) included in the seventh active area 6103 via the third data lines D1_j. Similarly, the second driver 6302 may drive pixels (not shown) included in the eighth active area 6104 via sixth gate lines G2a_i and G2b_i, and may provide the image signal to the pixels (not shown) included in the eighth active area 6104 via the fourth data lines D2_j.

The first driver 6301 may include the first timing controller 6321, the first gate driver 6321, the first data driver 6331, and the first gray scale voltage generator 6341. The first driver 6301 may be disposed in portions on the left side of, above, and below the seventh active area 6103. Specifically, the first timing controller 6321 and the first data driver 6331 may be disposed in the portion on the left side of the seventh active area 6103, and first gate drivers 6321a and 6321b may be separately disposed in the portions above and below the seventh active area 6103. In this regard, the first gate drivers 6321a and 6321b may be separately disposed in the upper bezel 6201 and the lower bezel 6202 of the flexible display panel 151. The first gate driver 6321a disposed in the upper bezel 6201 may transmit a driving signal via the fifth gate line G1a_i connected to a bottom thereof, and the first gate driver 6321b disposed in the lower bezel 6202 may transmit a driving signal via the fifth gate line G1b_i connected to a top thereof. The first gate drivers 6321a and 6321b may be in charge of pixel columns that respectively transmit driving signals in a divided manner, so that widths of the upper bezel 621 and the lower bezel 6202 may be prevented from being widened.

The second driver 6302 may include the second timing controller 6312, the second gate driver 6322, the second data driver 6332, and the second gray scale voltage generator 6342. The second driver 6302 may be disposed on portions on the right side of, above, and below the eight active area 6104. Specifically, the second timing controller 6322 and the second data driver 6332 may be disposed in the portion on the right side of the eighth active area 6104, and second gate drivers 6322a and 6322b may be separately disposed in the portions above and below the eighth active area 6104. In this regard, the second gate drivers 6322a and 6322b may be separately disposed in the upper bezel 6201 and the lower bezel 6202 of the flexible display panel 151. The first gate driver 6322a disposed in the upper bezel 6201 may transmit a driving signal via the sixth gate line G2a_i connected to a bottom thereof, and the second gate driver 6322b disposed in the lower bezel 6202 may transmit a driving signal via the sixth gate line G2b_i connected to a top thereof. The second gate drivers 6322a and 6322b may be in charge of pixel columns that respectively transmit driving signals in a divided manner, so that widths of the upper bezel 621 and the lower bezel 6202 may be prevented from being widened.

One embodiment shown in FIG. 16 may supplement the shortcomings of the embodiment shown in FIG. 15.

First, the power consumption may be reduced by optionally utilizing the two drivers 6301 and 6302. The flexible display panel 151 according to FIG. 16 may drive the active area 610 in the left and right direction via the two drivers 6301 and 6302, so that, when the active area 610 corresponds to the left area in the screen viewed from the front, only the first driver 6301 may be driven. When the screen is expanded in the first direction A and the right area of the active area 610 is exposed to the front face, the first driver 6302 may be driven together. In addition, when the user views the screen from the rear face, only the second driver 6302 corresponding to the right area of the active area 620 may be driven.

Second, even with the two drivers 6301 and 6302, thicknesses of the upper and lower bezels 6201 and 6202 may be reduced. In the embodiment of FIG. 15, as the first gate driver 6321 of the first driver 6301 is concentrated on the upper bezel 6201, the upper bezel 6201 increases, and, as the second gate driver 6322 of the second driver 6302 is concentrated on the lower bezel 6202, the lower bezel 6202 increases. However, in the embodiment in FIG. 16, the first gate driver 6321 may be divided into two first gate drivers and the two first gate drivers may be disposed in the upper bezel 6201 and the lower bezel 6202, and there are substantially few pixel rows providing the driving signals, so that the widths of the upper bezel 6201 and the lower bezel 6202 may be smaller than those in FIG. 14. Similarly, the second gate driver 6322 is also divided into two second gate drivers and the two second gate drivers are disposed in the upper bezel 6201 and the lower bezel 6202.

Third, even when the flexible display panel 151 is manufactured larger in the first direction A, high voltage driving is not required. The first gate driver 6321 and the second gate driver 6322 are disposed at the both sides to face each other around a center, so that an actual moving distance of the signal is reduced, thereby reducing the internal voltage drop. Therefore, even when the flexible display panel 151 is manufactured to be elongated in the first direction A, there is no need to drive the flexible display panel 151 with a higher voltage.

Figure 17:
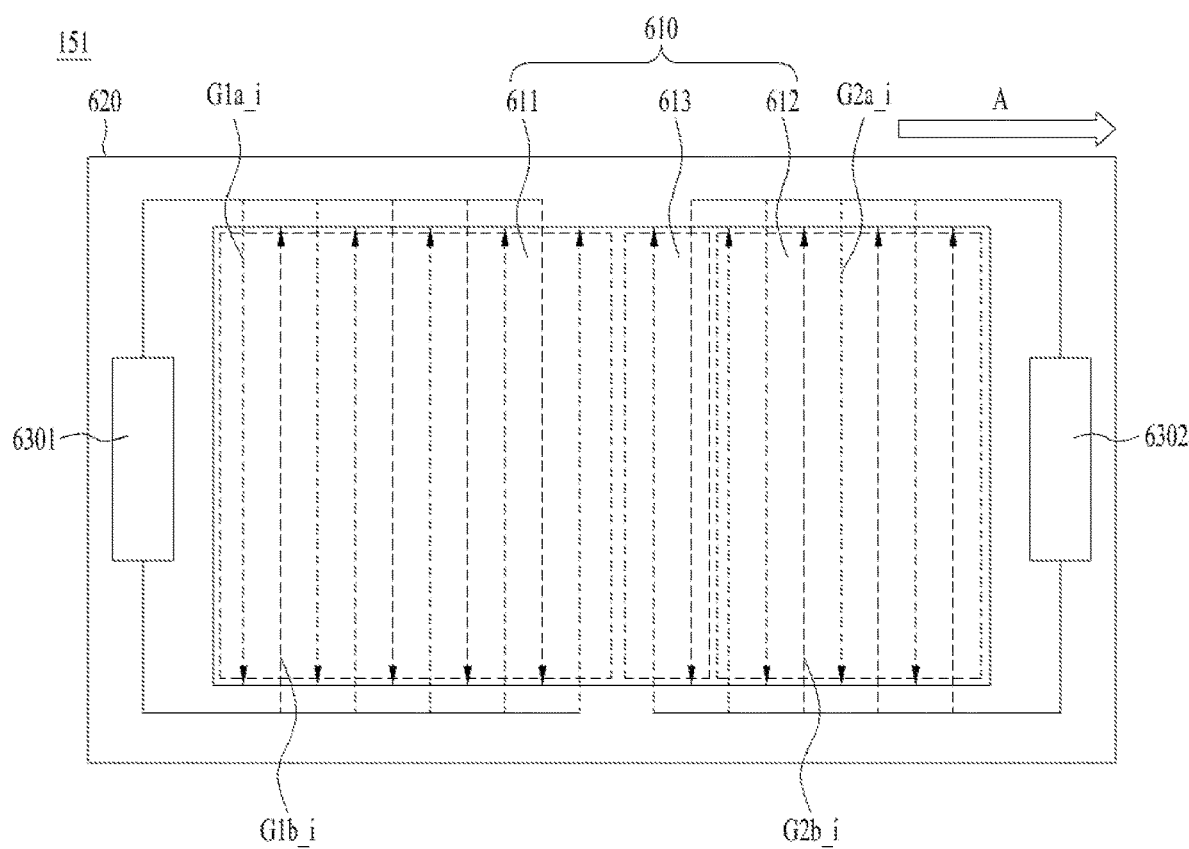
FIG. 17 shows one embodiment of an area in which two drivers provide driving voltages in a flexible display panel.
Figure 18:
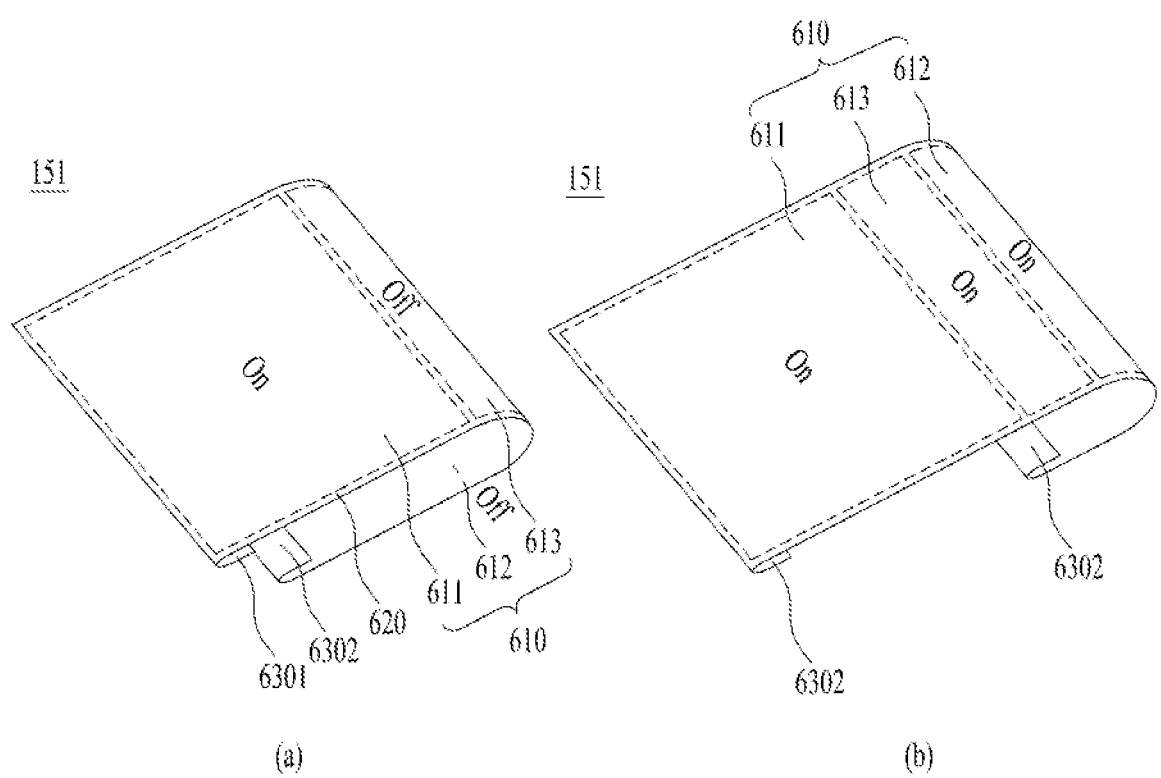
FIG. 18 shows a first state ((a) in FIG. 18) and a second state ((b) in FIG. 18) of a flexible display panel in FIG. 17.

FIG. 17 shows one embodiment of an area in which the two drivers 6301 and 6302 provide driving voltages in the flexible display panel 151. FIG. 18 shows a first state ((a) in FIG. 18) and a second state ((b) in FIG. 18) of the flexible display panel 151 in FIG. 17.

The flexible display panel 151 according to one embodiment may include the first driver 6301 on one side of the active area 610 and the second driver 6302 on the other side of the active area 610. Specifically, the first driver 6301 and the second driver 6302 may be disposed on the both sides of the active area 610 along the first direction A. The both sides of the flexible display panel 151 at which the first driver 6301 and the second driver 6302 are disposed may be folded and respectively disposed on rear faces of portions of the first active area 610 and the second active area 620.

The flexible display panel 151 according to one embodiment may include, in the first state corresponding to (a) in FIG. 5, a first active area 611 exposed to the front face of the mobile terminal, a second active area 612 exposed to the rear face, and a third active area 613 surrounding the first roller 1028. In this regard, the first active area 611, the second active area 612, and the third active area 613 may be fixed areas unlike the first active area 211, the second active area 212, and the third active area 213 described in FIG. 7.

The flexible display panel 151 according to one embodiment may control the image signal output by the first driver 6301 from the first active area 611, and control the image signals output by the second driver 6302 from the second active area 612 and the third active area 613. The first driver 6301 and the second driver 6302 may operate independently. That is, while the first driver 6301 drives pixels of the first active area 611 and outputs the image, the second driver 6302 may not drive pixels of the second active area 612 and the third active area 613. Conversely, while the first driver 6301 does not drive the pixels of the first active area 611, the second driver 6302 may drive the pixels of the second active area 612 and the third active area 613 and output the image.

In the flexible display panel 151 according to one embodiment, the first driver 6301 and the second driver 6302 may operate to correspond to the state of the mobile terminal. That is, in the first state, only the first driver 6301 may operate to apply the driving signal to the first active area 611 and output the image. In this regard, the first state may correspond to (a) in FIG. 5. In the second state, both the first driver 6301 and the second driver 6302 may operate. In this regard, the second state may correspond to (b) in FIG. 5. Alternatively, the second state may be a state in which at least a portion of the third active area 613 is disposed on the same plane as the first active area 611. Referring to FIG. 5, the second state may define a state in which the second frame 102 has moved such that the screen exposed on the front face is widened from the first state.

In the flexible display panel 151 according to one embodiment, the first driver 6301 and the second driver 6302 may operate in response to rolling of the mobile terminal in the first state. When the front face of the mobile terminal faces the user in the first state, only the first driver 6301 may operate to apply the driving signal to the first active area 611 and output the image. Conversely, when the rear face of the mobile terminal faces the user in the first state, only the second driver 6302 may operate to apply the driving signal to the second active area 612 and the third active area 613.

In this regard, in some cases, the image may be output only on the second active area 612.

Figure 19:
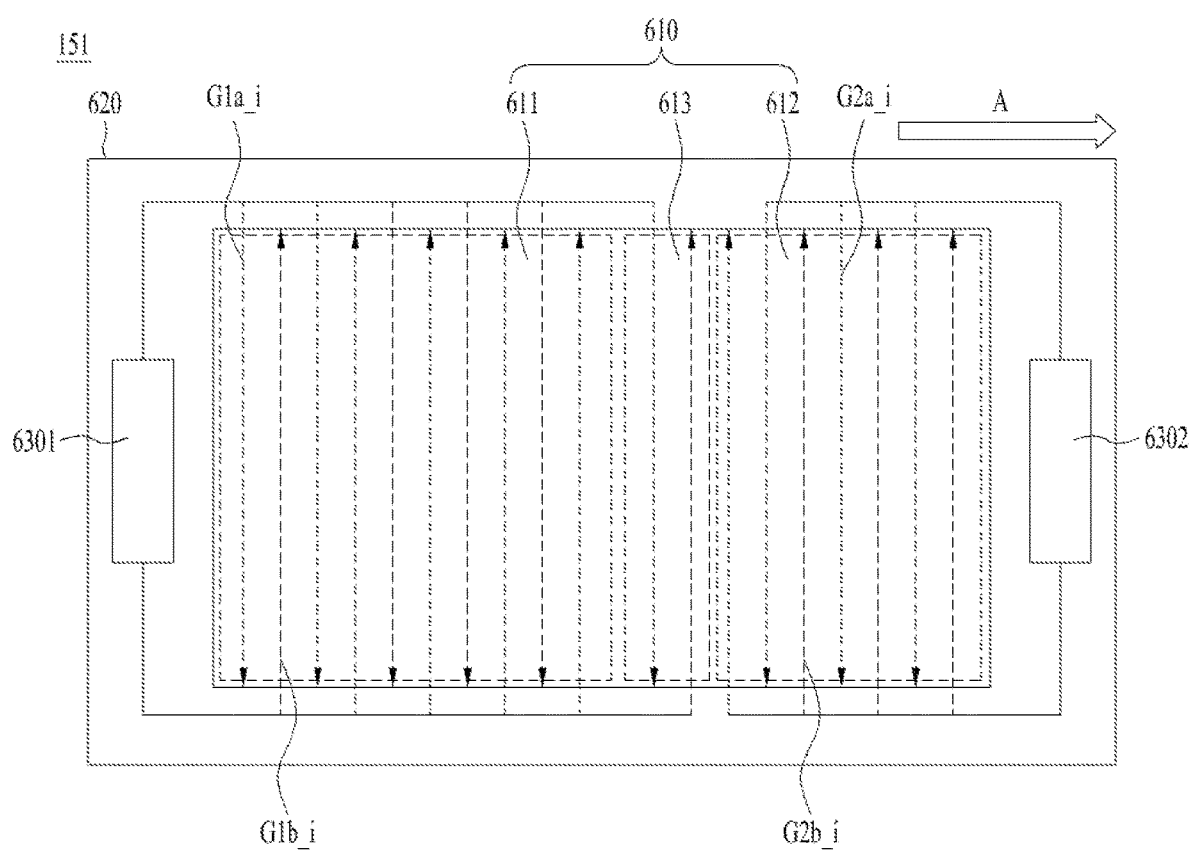
FIG. 19 shows one embodiment of an area in which two drivers provide driving voltages in a flexible display panel.
Figure 20:
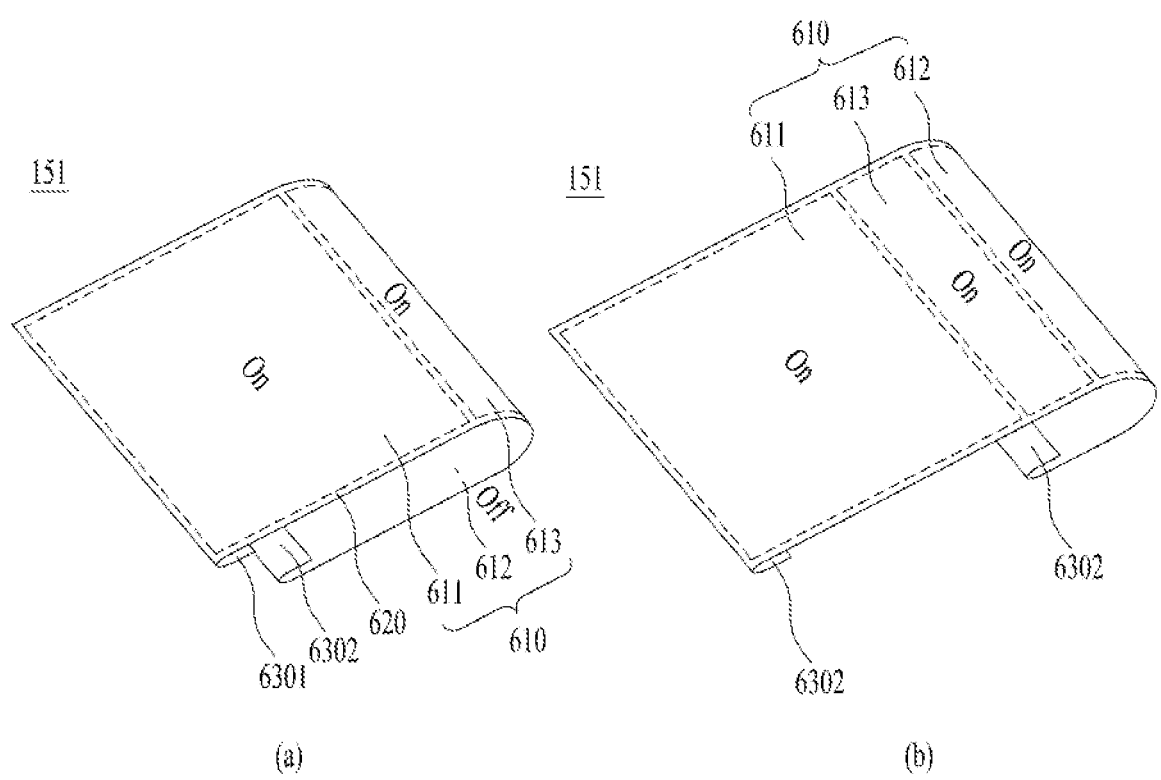
FIG. 20 shows a first state ((a) in FIG. 20) and a second state ((b) in FIG. 20) of a flexible display panel in FIG. 19.

FIG. 19 shows one embodiment of an area in which the two drivers 6301 and 6302 provide driving voltages in the flexible display panel 151. FIG. 20 shows a first state ((a) in FIG. 20) and a second state ((b) in FIG. 20) of the flexible display panel 151 in FIG. 19.

The flexible display panel 151 according to one embodiment may include the first driver 6301 on one side of the active area 610 and the second driver 6302 on the other side of the active area 610. Specifically, the first driver 6301 and the second driver 6302 may be disposed on the both sides of the active area 610 along the first direction A. The both sides of the flexible display panel 151 at which the first driver 6301 and the second driver 6302 are disposed may be folded and respectively disposed on the rear faces of the portions of the first active area 610 and the second active area 620.

The flexible display panel 151 according to one embodiment may include, in the first state corresponding to (a) in FIG. 5, the first active area 611 exposed to the front face of the mobile terminal, the second active area 612 exposed to the rear face, and the third active area 613 surrounding the first roller 1028. In this regard, the first active area 611, the second active area 612, and the third active area 613 may be the fixed areas unlike the first active area 211, the second active area 212, and the third active area 213 described in FIG. 7.

The flexible display panel 151 according to one embodiment may control the image signals output by the first driver 6301 from the first active area 611 and the third active area 613, and control the image signal output by the second driver 6302 from the second active area 612. The first driver 6301 and the second driver 6302 may operate independently. That is, while the first driver 6301 drives the pixels of the first active area 611 and the third active area 613 and outputs the image, the second driver 6302 may not drive the pixels of the second active area 612. Conversely, while the first driver 6301 does not drive the pixels of the first active area 611 and the third active area 613, the second driver 6302 may drive the pixels of the second active area 612 and output the image.

In the flexible display panel 151 according to one embodiment, the first driver 6301 and the second driver 6302 may operate to correspond to the state of the mobile terminal. That is, in the first state, only the first driver 6301 may operate to apply the driving signal to the first active area 611 and output the image. In this regard, the first state may correspond to (a) in FIG. 5. In the second state, both the first driver 6301 and the second driver 6302 may operate. In this regard, the second state may correspond to (b) in FIG. 5. Alternatively, the second state may be the state in which at least the portion of the third active area 613 is disposed on the same plane as the first active area 611. Referring to FIG. 5, the second state may define the state in which the second frame 102 has moved such that the screen exposed on the front face is widened from the first state. Alternatively, the second state may be a state in which an entire area of the third active area 613 is disposed on the same plane as the first active area 611.

In the flexible display panel 151 according to one embodiment, the first driver 6301 and the second driver 6302 may operate in response to the rolling of the mobile terminal in the first state. When the front face of the mobile terminal faces the user in the first state, only the first driver 6301 may operate to apply the driving signal to the first active area 611 and the third active area 613 and output the image. In this regard, in some cases, the image may be output only on the first active area 611. Conversely, when the rear face of the mobile terminal faces the user in the first state, only the second driver 6302 may operate to apply the driving signal to the second active area 612.

The detailed description above should not be construed as restrictive in all respects and should be considered as exemplary. The scope of the present disclosure should be determined by a reasonable interpretation of the appended claims, and all changes within the equivalent scope of the present disclosure are included in the scope of the present disclosure.

What is claimed is:

1. A mobile terminal comprising:
a display panel including an active area for outputting an image, wherein the active area is divided into a first active area and a second active area arranged in a first direction;
a first driver disposed at a first edge of the display panel so as to control an image output from the first active area; and
a second driver disposed at a second edge opposite to the first edge of the display panel to control an image output from the second active area,
wherein the first driver is disposed in the first edge of the display panel, wherein the first driver includes a first gate driver, wherein the first gate driver includes two gate drivers divided and disposed at a third edge and a fourth edge adjacent to the first edge of the display panel, wherein the two gate drivers of the first gate driver are configured to apply a driving signal to pixels included in the first active area along the third edge and the fourth edge,
wherein the second driver is disposed in the second edge of the display panel, wherein the second driver includes a second gate driver, wherein the second gate driver includes two gate drivers divided and disposed at the third edge and the fourth edge adjacent to the second edge of the display panel, wherein the two gate drivers of the second gate driver are configured to apply a driving signal to pixels included in the second active area along the third edge and the fourth edge.

2. The mobile terminal of claim 1,
wherein the two gate drivers of the first gate driver respectively apply the driving signal to two divided areas of the first active area,
wherein the two gate drivers of the second gate driver respectively apply the driving signal to two divided areas of the second active area.

3. The mobile terminal of claim 1, wherein the display panel is a flexible display panel.

4. The mobile terminal of claim 3, further comprising:
a roller member for winding or bending the display panel to change an area of the active area exposed on a front face of the mobile terminal.

5. The mobile terminal of claim 4, wherein the first driver and the second driver are optionally driven the active area corresponding to the area of the active area exposed on the front face of the mobile terminal.

6. The mobile terminal of claim 5, wherein the first driver is driven when at least a portion of the first active area is exposed on the front face of the mobile terminal,
wherein the second driver is driven when at least a portion of the second active area is exposed on the front face of the mobile terminal.

7. The mobile terminal of claim 4, further comprising:
a first frame; and
a second frame coupled to the first frame to be movable toward the first direction or a second direction opposite to the first direction,
wherein the display panel is constructed to surround the second frame, so that the area of the active area exposed on the front face of the mobile terminal is the minimum in a first state and the area of the active area exposed on the front face of the mobile terminal is the maximum in a second state.

8. The mobile terminal of claim 7, wherein the active area exposed on the front face in the first state corresponds to the first active area, and only the first driver is driven in the first state to output the image in the first active area.

9. The mobile terminal of claim 8, wherein the second driver is driven to output the image in the second active area when a state of the display panel is switched from the first state to the second state.

10. The mobile terminal of claim 8, wherein the second driver is driven when a state of the display panel starts to switch from the first state to the second state to output the image in the second active area.

11. The mobile terminal of claim 8, wherein the first active area includes an active area exposed on a side face of the mobile terminal in the first state.

12. The mobile terminal of claim 8, further comprising:
a sensing unit for sensing whether the front face or a rear face of the mobile terminal faces a user,
wherein, in the display panel, only the first driver is driven to output the image in the first active area when the front face of the mobile terminal faces the user in the first state,
wherein, in the display panel, only the second driver is driven to output the image in the second active area when the rear face of the mobile terminal faces the user in the first state.

13. The mobile terminal of claim 12, wherein the sensing unit includes at least one of a motion sensor for sensing rolling of the mobile terminal or an optical sensor for recognizing a face or a gaze of the user.

* * * * *